United States Patent
Yamashita

(10) Patent No.: US 12,282,576 B2
(45) Date of Patent: Apr. 22, 2025

(54) SERVER APPARATUS

(71) Applicant: TOYOTA JIDOSHA KABUSHIKI KAISHA, Toyota (JP)

(72) Inventor: Yuki Yamashita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 17/948,447

(22) Filed: Sep. 20, 2022

(65) Prior Publication Data

US 2023/0092069 A1 Mar. 23, 2023

(30) Foreign Application Priority Data

Sep. 22, 2021 (JP) ................................. 2021-153996

(51) Int. Cl.
*G06F 21/62* (2013.01)

(52) U.S. Cl.
CPC ................................. *G06F 21/6218* (2013.01)

(58) Field of Classification Search
None
See application file for complete search history.

(56) References Cited

U.S. PATENT DOCUMENTS

| | | | | |
|---|---|---|---|---|
| 10,361,843 B1 * | 7/2019 | Suthar | ................... | H04L 9/3257 |
| 10,546,296 B2 * | 1/2020 | Narasimhan | ............ | H04L 63/08 |
| 10,586,062 B1 * | 3/2020 | Rangan | ............... | G06F 21/6209 |
| 11,769,577 B1 * | 9/2023 | Dods | ...................... | G16H 20/10 |
| | | | | 705/50 |
| 11,809,403 B2 * | 11/2023 | Shpurov | ............... | H04L 9/3271 |
| 2017/0116693 A1 * | 4/2017 | Rae | ...................... | G06Q 50/184 |
| 2017/0331896 A1 * | 11/2017 | Holloway | ............... | H04L 67/04 |
| 2018/0130158 A1 * | 5/2018 | Atkinson | ............... | G06Q 10/08 |
| 2018/0248880 A1 * | 8/2018 | Sardesai | ............... | H04L 9/3239 |
| 2019/0065764 A1 * | 2/2019 | Wood | ................... | G06F 21/6209 |
| 2019/0205844 A1 * | 7/2019 | Nuzzi | ....................... | H04L 9/50 |
| 2019/0238550 A1 * | 8/2019 | Zhang | ................... | H04L 63/105 |
| 2019/0305958 A1 * | 10/2019 | Qiu | ....................... | G06Q 20/389 |
| 2019/0311147 A1 * | 10/2019 | Gollogly | .................. | H04L 9/50 |
| 2020/0012765 A1 * | 1/2020 | Smaiely | ............... | H04L 9/3297 |
| 2020/0119906 A1 * | 4/2020 | Das | ........................ | H04L 9/3239 |
| 2020/0250176 A1 * | 8/2020 | Padmanabhan | ....... | H04L 9/3239 |
| 2021/0133359 A1 * | 5/2021 | Liu | .......................... | G06F 21/64 |
| 2021/0365584 A1 * | 11/2021 | Harris | ..................... | H04L 67/10 |
| 2022/0269808 A1 | 8/2022 | Himeno | | |

FOREIGN PATENT DOCUMENTS

| | | |
|---|---|---|
| JP | 2018-173692 A | 11/2018 |
| JP | 6587370 B1 | 10/2019 |
| JP | 2020-64483 A | 4/2020 |

* cited by examiner

*Primary Examiner* — Michael W Chao
(74) *Attorney, Agent, or Firm* — Sughrue Mion, PLLC

(57) ABSTRACT

A main-chain node of a management server updates agreement information on a main chain if a user agrees to provide data to a first app, which is a mini app of a wallet app, when subscribing to the first app. The updated agreement information is shared among service servers on the main chain. Based on the updated agreement information, a sub-chain node of the management server transmits user information to a sub-chain node of a service server that is added to the agreement information.

10 Claims, 12 Drawing Sheets

SERVER APPARATUS

This nonprovisional application is based on Japanese Patent Application No. 2021-133996 filed on Sep. 22, 2021 with the Japan Patent Office, the entire content of which is hereby incorporated by reference.

BACKGROUND

Field

The present disclosure relates to a server apparatus which forms a network that employs a distributed ledger technique.

Description of the Background Art

Japanese Patent No. 6587370 discloses a document management system which uses the blockchain technology to prevent tampering of documents that are shared among personal computers (PC). In the document management system, the PCs are connected to a network, which forms a PC cluster. The document management system has a means for reflecting a document, as it is recorded to one of the PCs, to records of other PCs belonging to the PC cluster. The document management system also has a means for generating and including a hash value for the document into a block. This allows documents to be shared in a PC cluster and prevent tampering of the documents.

SUMMARY

Data stored in a distributed ledger such as a blockchain can be referred to by all nodes joined the distributed ledger network. Depending of the content of data, data may be desired to be shared only among particular nodes joined the distributed ledger network. Conventionally, such a case is not supported.

The present disclosure is made to solve the problem above, and an object of the present disclosure is to enable data sharing only among particular nodes among those joined a distributed ledger network, while preventing tampering of the data by the distributed ledger technique.

(1) A server apparatus according to a certain aspect of the present disclosure is a server apparatus for use in a data sharing system using a distributed ledger technique. The data sharing system includes a plurality of other server apparatuses. The server apparatus includes a first distributed ledger configured to share authorization information related to sharing of data with the plurality of other server apparatuses. The authorization information includes information for limiting the sharing of the data to other server apparatus among the plurality of other server apparatuses. The server apparatus further includes a second distributed ledger configured to share the data with the other server apparatus based on the authorization information.

According to the above configuration, the first distributed ledger manages the authorization information, which is information for limiting the sharing of the data to the other server apparatus, and, based on the authorization information, the second distributed ledger allows only the other server apparatus to share the data with. The authorization information is managed by the first distributed ledger, thereby allowing the authorization information to be shared among the apparatuses (the server apparatus and the plurality of other server apparatuses) included in the data sharing system. This allows the authorization information to be monitored by all the apparatuses, thereby enhancing the tamper-resistant of the authorization information. Then, the server apparatus can share the data with only the other server apparatus, based on the authorization information.

(2) In a certain embodiment, the server apparatus further includes a control device that updates the first distributed ledger and the second distributed ledger. Based on the authorization information, the control device transmits the data stored in the second distributed ledger to the other server apparatus.

According to the above configuration, the server apparatus can transmit the data stored in the second distributed ledger and share the data with the other server apparatus.

(3) In a certain embodiment, when the authorization information is updated, the control device stores the updated authorization information into the first distributed ledger.

According to the above configuration, the updated authorization information is stored into the first distributed ledger. Thus, the server apparatus can share the updated authorization information with the plurality of other server apparatuses included in the data sharing system. This allows the authorization information to be monitored by all the apparatuses (the server apparatus and the plurality of other server apparatuses) included in the data sharing system, thereby enhancing the tamper-resistant of the authorization information.

(4) In a certain embodiment, the server apparatus provides a first application for providing a predetermined service. The first application is installed on a terminal device of a user. The terminal device provides the server apparatus with user information which is related to the user and entered when the first application is installed on the terminal device. Upon obtaining the user information, the control device sets the server apparatus to the authorization information for the user information, and stores the authorization information into the first distributed ledger.

The user of the terminal device provides the user information to the server apparatus providing the first application. According to the above configuration, the authorization information having the server apparatus set thereto is stored into the first distributed ledger. Thus, the server apparatus can share information with a plurality of other server apparatuses, indicating that the server apparatus is authorized to obtain the user information.

(5) in a certain embodiment, the predetermined service includes an identity verification service. The user information includes personal information of the user. Upon obtaining the user information, the control device: implements the identity verification service on the user information, and stores the user information having undergone identity verification into the second distributed ledger.

According to the above configuration, the user information having undergone identity verification is stored into the second distributed ledger. Thus, the user information can be prevented from being shared with other server apparatus that is not authorized to obtain the user information.

(6) In a certain embodiment, the control device stores information indicating a result of implementation of the identity verification service into the first distributed ledger.

According to the above configuration, the information indicating the result of implementation of the identity verification service is stored in the first distributed ledger. Thus, the server apparatus can share the updated authorization information with the plurality of other server apparatuses. This allows the information indicating the result of implementation of the identity verification service to be monitored by all the apparatuses included in the data sharing system, thereby enhancing the tamper-resistant of the information indicating the result of implementation of the identity verification service.

(7) In a certain embodiment, the first application includes a second application. The second application is an application that is provided by a predetermined server apparatus among the plurality of other server apparatuses. When the terminal device subscribes to the second application, the first application requests the terminal device to agree to share the user information with the second application. When the terminal device agrees, the control device adds the predetermined server apparatus to the authorization information.

According to the above configuration, if the terminal device agrees to share the user information with the second application, the predetermined server apparatus is added to the authorization information. The authorization information is stored into the first distributed ledger. Thus, the server apparatus can share the authorization information, having the predetermined server apparatus added thereto, with the plurality of other server apparatuses.

(8) In a certain embodiment, the control device shares the user information stored in the second distributed ledger with the predetermined server apparatus, based on the authorization information to which the predetermined server apparatus has been added.

According to the above configuration, along with the addition of the predetermined server apparatus to the authorization information, the server apparatus can share the user information with the predetermined server apparatus.

(9) In a certain embodiment, when the terminal device makes an application for cancelling subscription to the second application, the control device deletes the predetermined server apparatus from the authorization information.

According to the above configuration, in response to the terminal device applying for cancelling the subscription to the second application, the predetermined server apparatus providing the second application is deleted from the authorization information Since the updated authorization information is stored into the first distributed ledger, the server apparatus can share the updated authorization information with the plurality of other server apparatuses.

(10) In a certain embodiment, the server apparatus further includes a control device that updates the first distributed ledger and the second distributed ledger. When the server apparatus is added to the authorization information, the control device obtains the data from the other server apparatus having the data, and stores the data into the second distributed ledger.

According to the above configuration, the server apparatus itself is added to the authorization information, the server apparatus can obtain data corresponding to the authorization information can be obtained from the other server apparatus having that data.

(11) In a certain embodiment, when the server apparatus is deleted from the authorization information, the control device deletes data corresponding to the authorization information from the second distributed ledger.

According to the above configuration, if the server apparatus itself has lost its authorization to hold data, the server apparatus can appropriately delete that data from the second distributed ledger.

(12) In a certain embodiment, the server apparatus provides a second application included in a first application provided by a predetermined server apparatus which is any one of the plurality of other server apparatuses. The first application provides an identity verification service. The first distributed ledger stores information indicating a result of implementation of the identity verification service by the predetermined server apparatus. When the terminal device subscribes to the second application, the control device omits identity verification by referring to the information indicating the result of implementation of the identity verification service.

According to the above configuration, the first distributed ledger allows sharing of a result of implementation of the identity verification service by the predetermined server apparatus providing the first application, thereby omitting implementation of the identity verification. This achieves reduced labor costs for implementing the identity verification.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment according to the present disclosure will be described in detail, with reference to the accompanying drawings. Note that the same reference sign is used to refer to the same or like parts, and the description thereof will not be repeated.

Embodiment

<Overall Configuration of Data Sharing System>

Figure 1:
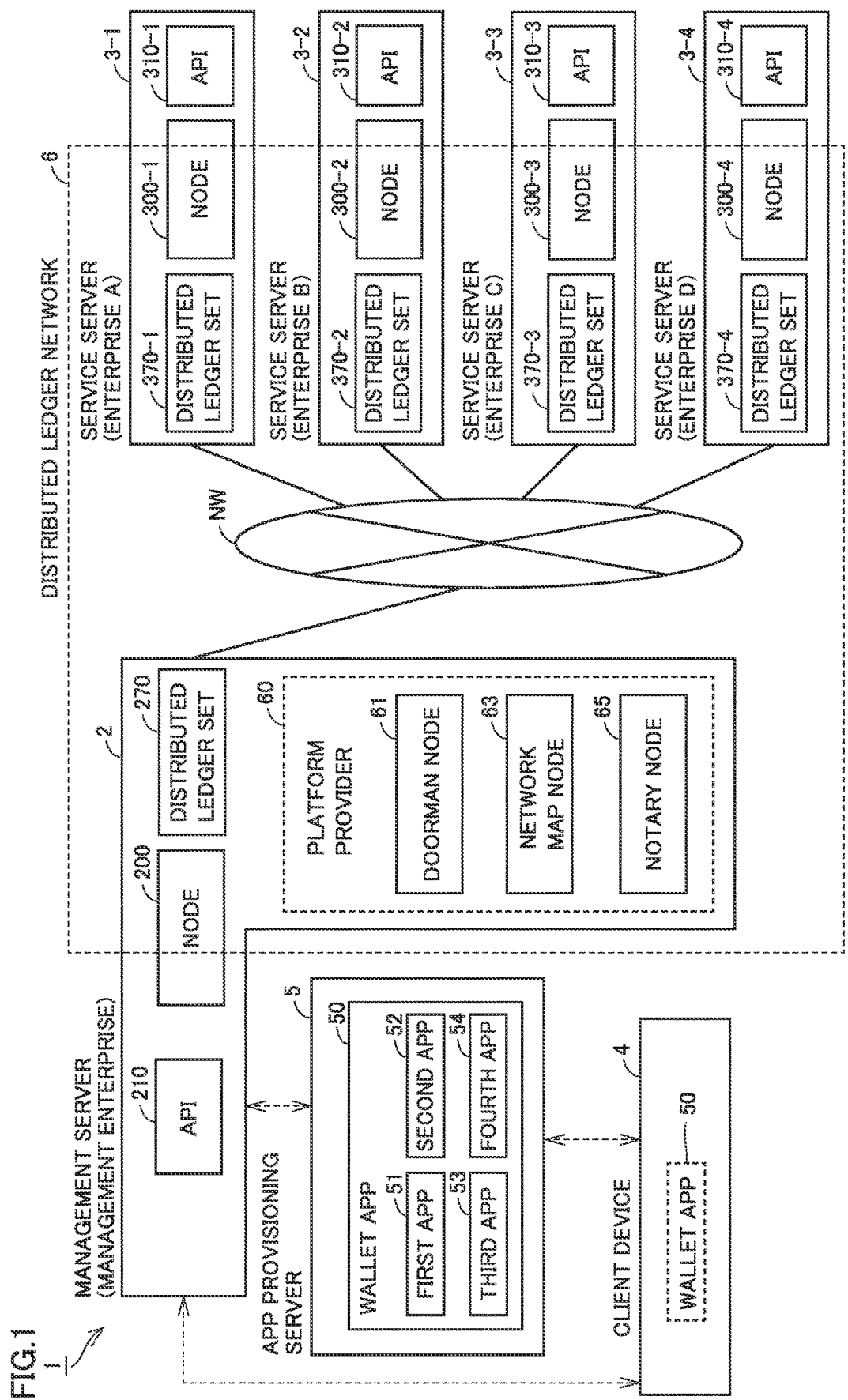
FIG. 1 is a diagram showing a schematic configuration of a data sharing system according to an embodiment.

FIG. 1 is a diagram showing a schematic configuration of a data sharing system 1 according to the present embodiment. The data sharing system 1 according to the present embodiment is a system in which a consortium network (hereinafter, also simply referred to as a "network") NW is formed among enterprises and data is shared among them using a distributed ledger technique.

The data sharing system 1 includes a management server 2, four service servers 3-1, 3-2, 3-3, and 3-4, a client device 4, and an app provisioning server 5. The four service servers 3-1 through 3-4 belong to different enterprises (e.g., an enterprise A, an enterprise B, an enterprise C, and an enterprise D). For example, the service server 3-1 belongs to the enterprise A, the service server 3-2 belongs to the enterprise B, the service server 3-3 belongs to the enterprise C, and the service server 3-4 belongs to the enterprise D. In the following, the service servers 3-1 through 3-4 will also be simply, collectively referred to as a "service server 3," unless otherwise distinguished.

The management server 2 belongs to a management enterprise operating the network NW. The management server 2 manages the network NW. The management server 2 receives an application from a respective service server 3 for joining the network NW. The management server 2 permits the service server 3 to join the network NW (a doorman node's function, described below), based on an operation, by an administrator of the management server 2, of permitting the service server 3 to join the network NW or based on a result of determination of predetermined conditions. In the present embodiment, the four service servers 3, respectively belonging to the enterprise A, the enterprise B, the enterprise C. and the enterprise D, are permitted to join the network NW.

The management server 2 also manages the app provisioning server 5. The app provisioning server 5 is, what is called, a marketplace which provides applications. The management server 2 provides a wallet app 50 at the app provisioning server 5.

The app provisioning server 5 is capable of communications with the client device 4. The app provisioning server 5 provides applications to the client device 4. The client device 4 can access the app provisioning server 5 and applications that are provided at the app provisioning server 5 can be installed on the client device 4. In the present embodiment, the app provisioning server 5 provides the wallet app 50. The wallet app 50 can be installed on the client device 4 from the app provisioning server 5. While the present embodiment will be described with reference to the app provisioning server 5 providing one application (the wallet app 50), it should be noted that the app provisioning server 5 may provide multiple applications.

The wallet app 50 is an application that provides a know your customer (KYC) service. The wallet app 50 may be an application that provides various services, in addition to the KYC service.

The wallet app 50 is, what is called, a super app, which contains a first app 51, a second app 52, a third app 53, and a fourth app 54 as, what is called, mini apps. The first app 51 is an application for using a first service provided by the enterprise A managing the service server 3-1. The service server 3-1 for the enterprise A subscribes to the first app 51 as a mini app in the wallet app 50. The second app 52 is an application for using a second service provided by the enterprise B managing the service server 3-2. The service server 3-2 for the enterprise B subscribes to the second app 52 as a mini app in the wallet app 50. The third app 53 is an application for using a third service provided by the enterprise C managing the service server 3-3. The service server 3-3 for the enterprise C subscribes to the third app 53 as a mini app in the wallet app 50. The fourth app 54 is an application for using a fourth service provided by the enterprise D managing the service server 3-4. The service server 3-4 for the enterprise D subscribes to the fourth app 54 as a mini app in the wallet app 50.

A framework for the wallet app 50 is used to develop the first app 51 through the fourth app 54. For example, the first app 51 through the fourth app 54 may operate on a browser in the wallet app 50 and provide the services provided by the service servers 3-1 through 3-4 (the first service through the fourth service), in conjunction with an application program interface (API) 210 of the management server 2 and APIs 310-1, 310-2, 310-3, and 310-4 of the service servers 3-1, 3-2, 3-3, and 3-4, respectively. The first service through the fourth service may be any services, such as a car-rental service, a car-sharing service, an insurance service, a public service, a car-dealer service, a maintenance service, etc.

The client device 4 is, for example, smartphone, a tablet, a desktop personal computer (PC), a note PC, or other information processing terminal having a communication function. The client device 4 can launch the first app 51, the second app 52, the third app 53, and the fourth app 54 from within the wallet app 50 installed on the client device 4, and utilize the services provided by the enterprises (the service servers 3-1 through 3-4). As described below in detail, when each mini app is launched (subscribed to) for the first time, the client device 4 is requested to agree to provide user information of a user of the client device 4, including personal information of the user, to the service server 3 from which the application is provided to the client device 4.

The management server 2 and the service server 3 are each loaded with two software programs each having a distributed ledger infrastructure. The software having a first distributed ledger infrastructure (hereinafter, also referred to as "first software") includes a smart contract for the server to function as a node that constructs a broadcast-type main chain. The software having a second distributed ledger infrastructure (hereinafter, also referred to as "second software") includes a smart contract for the server to function as a node that constructs a peer-to-peer (P2P) sub chain. For example, CORDA (registered trademark) may be employed as the second distributed ledger infrastructure. The loaded first software functions to cause a control device 21 included in the management server 2 (FIG. 2) and a control device 31 included in the service server 3 (FIG. 3) to function as a main-chain node 200A (FIG. 2) and a main-chain node 300A (FIG. 3), respectively. The loaded second software functions to cause the control device 21 included in the management server 2 (FIG. 2) and the control device 31 included in the service server 3 (FIG. 3) to function as a sub-chain node 200B (FIG. 2) and a sub-chain node 300B (FIG. 3), respectively.

Furthermore, the control device 21 included in the management server 2 (FIG. 2) and the control device 31 included in the service server 3 (FIG. 3) also function as an off-chain node 200. (FIG. 2) and an off-chain node 300C (FIG. 3), respectively, which perform processes outside the network NW. In FIG. 1, the main-chain node 200A, the sub-chain node 200B, and the off-chain node 200C are collectively denoted as a "NODE 200," and the main-chain node 300A, the sub-chain node 300B, and the off-chain node 300C are collectively denoted as a "NODE 300."

The management server 2 has a distributed ledger set 270. The service server 3 has a distributed ledger set 370. The distributed ledger set 270 and the distributed ledger set 370 have the same data structure. For this reason, in the following, the distributed ledger set 270 will be described representatively.

The distributed ledger set 270 includes a distributed ledger 271 (FIG. 2) storing transaction data that is shared on the main chain, and a distributed ledger 272 (FIG. 2) storing transaction data that is shared on the sub chain.

The distributed ledger 271 stores transaction data that is shared on a broadcast-type main chain, and the distributed ledger 271 is published to all main-chain nodes joined the network NW. In other words, the distributed ledger 271 of the management server 2, a distributed ledger 371-1 (FIG. 3) of the service server 3-1, a distributed ledger 371-2 (FIG. 3) of the service server 3-2, a distributed ledger 371-3 (FIG. 3) of the service server 3-3, and a distributed ledger 371-4 (FIG. 3) of the service server 3-4 hold the same transaction data.

The distributed ledger 272 stores transaction data that is shared on a P2P sub chain, and the published range is limited to parties. As described below in more detail, a range of publication of the distributed ledger 272 is limited based on the authorization information (agreement information) stored on the main chain (the distributed ledger 271). Therefore, the distributed ledger 272 of the management server 2, the distributed ledger 372-1 (FIG. 3) of the service server 3-1, the distributed ledger 372-2 (FIG. 3) of the service server 3-2, the distributed ledger 372-3 (FIG. 3) of the service server 3-3, and the distributed ledger 372-4 (FIG. 3) of the service server 3-4 can hold different transaction data.

The software stored in a read only memory (ROM) functions to cause the control device 21 included in the management server 2 (FIG. 2) to function as a platform provider 60. The platform provider 60 has a function of managing the network NW. The platform provider 60 includes a doorman node 61, a network map node 63, and a notary node 65.

The doorman node 61 approves an application from the node 300 for joining the network NW. The doorman node 61 also issues a certificate to the node 300. The node 300 creates a pair of a private key and a public key when the node 300 joins the network NW, and transmits to the doorman node 61 a request to grant the node 300 a certificate. The doorman node 61 verifies predetermined conditions, and issues a certificate to the node 300 that requested the certificate be granted.

The network map node 63 stores information (e.g., the IP address) regarding the node 300 to which the certificate has been issued (i.e., joining the network NW is permitted) by the doorman node 61. The network map node 63 functions as a domain name system (DNS) in the network NW. The node 200 and the node 300 recognize the destination of transaction data, based on information provided by the network map node 63, for example.

The notary node 65 gives finality to the transaction data in the sub chain. The node 200 (the sub-chain node 200B) and the node 300 (the sub-chain node 300B), when they generate transaction data, send data that includes a hash value of the transaction data and the index of an output of the transaction data to the notary node 65. The notary node 65 receives and holds the data from the node 200 or the node 300 in the order and thereby assures the order of the transaction data in the sub chain.

Figure 2:
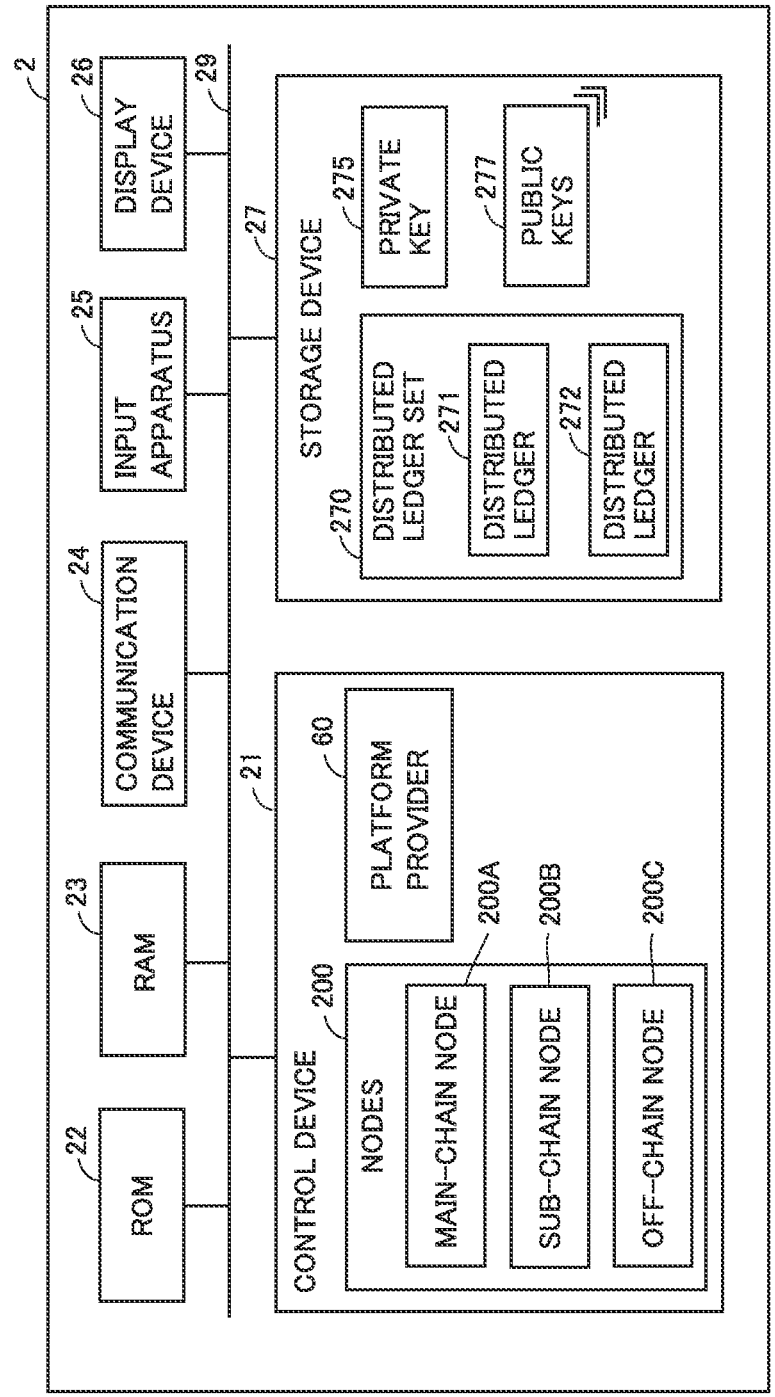
FIG. 2 is a diagram for illustrating a hardware configuration of a management server.

FIG. 2 is a diagram for illustrating a hardware configuration of the management server 2. The management server 2 includes a control device 21, a ROM 22, a random access memory (RAM) 23, a communication device 24, an input apparatus 25, a display device 26, and a storage device 27. The control device 21, the ROM 22, the RAM 23, the communication device 24, the input apparatus 25, the display device 26, and the storage device 27 are connected to a bus 29.

The control device 21 is configured of, for example, an integrated circuit which includes a central processing unit (CPU). Various programs stored in the ROM 22 are deployed on the RAM 23 and executed by the control device 21. The various programs include the operating system, etc. The RAM 23 functions as a working memory, and temporarily stores various data that are used to execute the various programs. As described below in more detail, the control device 21 includes the main-chain node 200A which functions at the main chain, the sub-chain node 200I which functions at the sub chain, and the off-chain node 200C which functions off-chain (outside the network NW). The control device 21 also includes the aforementioned platform provider 60 which functions in the network NW.

The communication device 24 is capable of communications with external devices. The external devices include, for example, the service server 3, the client device 4, and the app provisioning server 5, etc. The communication device 24 communicates with the external devices, using the Internet, a wide area network (WAN), a local area network (LAN), an Ethernet (registered trademark) network, a public network, a private network, a wired or wireless network, or a combination thereof.

The input apparatus 25 includes an input device. The input device is, for example, a mouse, a keyboard, a touch panel, and/or other device capable of receiving user operations.

The display device 26 includes a display. The display device 26 displays various images on the display, in accordance with control signals from the control device 21. The display is, for example, a liquid crystal display, an organic electro luminescence (EL) display, or other display device.

The storage device 27 includes a storage medium such as a hard disk or a flash memory, for example. The storage device 27 stores the distributed ledger set 270, a private key 275, and multiple public keys 277. The distributed ledger set 270 and a distributed ledger set 370, which is described below, will be described below in detail.

The private key 275 is a private key for a management enterprise managing the management server 2. For example, the control device 21 generates a private key and a public key to form a network for the first time. The control device 21 then transmits the public key to a certificate authority (not shown) and the public key is certified. The certificate authority issues an electronic certificate. The certificate authority issues an electronic certificate containing the public key information. The control device 21 stores a private key 275 corresponding to the certified public key into the storage device 27. The control device 21 also transmits the certified public key (the electronic certificate) to the service servers 3-1 through 3-4 joined the network NW.

The public keys 277 include a public key of the enterprise A, a public key of the enterprise B, a public key of the enterprise C, and a public key of the enterprise D. The control device 21 stores the public key received from the service server 3 into the storage device 27. The storage device 27 may also store the public key of the management server 2 (the management enterprise) itself.

When generating transaction data, the control device 21 creates an electronic signature, using the private key 275, and includes the electronic signature in the transaction data. Upon receiving transaction data from the service server 3, the control device 21 validates the validity of an electronic signature included in the transaction data, using the public key of the source of the transaction data, among the public keys 277.

Figure 3:
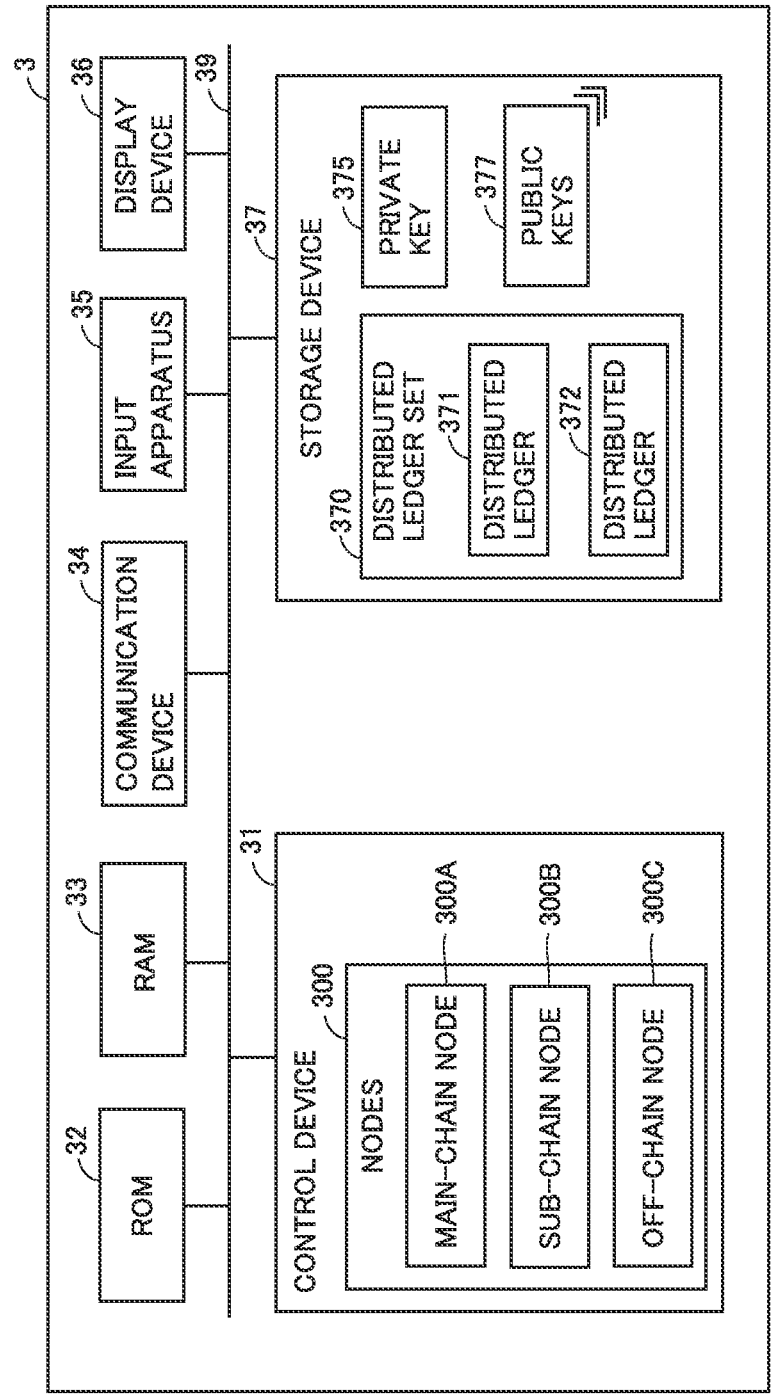
FIG. 3 is a diagram for illustrating a hardware configuration of a service server.

FIG. 3 is a diagram for illustrating a hardware configuration of the service server 3. The service servers 3-1 through 3-4 have basically the same hardware configuration. FIG. 3 is described with reference to the service server 3-1 of the enterprise A where an enterprise to which the service server 3 belongs to should be identified.

The service server 3 includes a control device 31, a ROM 32, a RAM 33, a communication device 34, an input apparatus 35, a display device 36, and a storage device 37. The control device 31, the ROM 32, the RAM 33, the communication device 34, the input apparatus 35, the display device 36, and the storage device 37 are connected to a bus 39.

The control device 31 is configured of, for example, an integrated circuit which includes a CPU. Various programs stored in the ROM 32 are deployed on the RAM 33 and executed by the control device 31. The various programs include the operating system, etc. The RAM 33 functions as a working memory, and temporarily stores various data that are used to execute the various programs. The control device 31 includes the main-chain node 300A which functions at the main chain, the sub-chain node 300B which functions at the sub chain, and the off-chain node 300C which functions off-chain (outside the network NW).

The communication device 34, the input apparatus 35, and the display device 36 basically have the same configuration as the communication device 24 and the input apparatus 25, and the display device 26, respectively, of the management server 2, the description thereof thus will not be repeated.

The storage device 37 includes a storage medium such as a hard disk or a flash memory, for example. The storage device 37 stores the distributed ledger set 370, a private key 375, and multiple public keys 377.

A private key 375-1 is a private key for the enterprise A managing the service server 3-1. For example, the service server 3-1 of the enterprise A generates a private key and a public key to join the network NW for the first time. The control device 31-1 then transmits the public key to the certificate authority (not shown), and the public key is certified. The control device 31-1 stores the private key 375-1 corresponding to the certified public key into the storage device 37-1. The control device 31-1 also transmits the certified public key (electronic certificate) to the doorman node 61 and is granted a certificate. This certificate is included in transaction data issued by the service server 3-1. The control device 31-1 also transmits the certified public key (electronic certificate) to the management server 2 and the service servers 3-2 through 3-4 forming the network NW.

Public keys 377-1 include the public key of a management enterprise, the public key of the enterprise B, the public key of the enterprise C, and the public key of the enterprise D. The control device 31-1 stores the public keys received front the management server 2 and the service servers 3-2 through 3-4 into the storage device 37-1. The storage device 37-1 may also store the public key of the service server 3-1 (the enterprise A) itself.

When generating transaction data, the control device 31-1 creates an electronic signature, using the private key 375-1, and includes the electronic signature in the transaction data. Upon receiving the transaction data from the management server 2 or the service servers 3-2 through 3-4, the control device 31-1 validates the validity of an electronic signature included in the transaction data, using the public key of the source of the transaction data, among the public keys 377-1.

Figure 4:
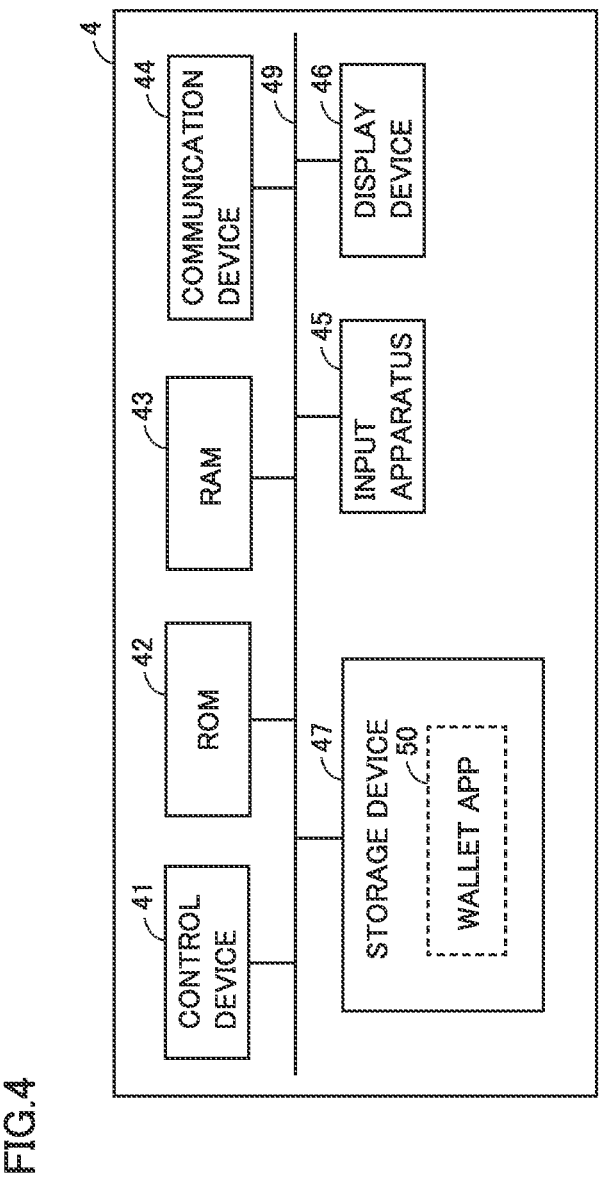
FIG. 4 is a diagram for illustrating a hardware configuration of a client device.

FIG. 4 is a diagram for illustrating a hardware configuration of the client device 4. The client device 4 includes a control device 41, a ROM 42, a RAM 43, a communication device 44, an input apparatus 45, a display device 46, and a storage device 47. The control device 41, the ROM 42, the RAM 43, the communication device 44, the input apparatus 45, the display device 46, and the storage device 47 are connected to a bus 49.

The control device 41 is configured of, for example, an integrated circuit which includes a CPU. Various programs stored in the ROM 42 are deployed on the RAM 43 and executed by the control device 41. The various programs include the operating system, etc. The RAM 43 functions as a working memory, and temporarily stores various data that are used to execute the various programs. The control device 41 has functions of installing and executing applications from the app provisioning server 5 via the communication device 44.

The communication device 44 and the display device 46 basically have the same configuration as the communication device 24 and the display device 26, respectively, of the management server 2, the description thereof thus will not be repeated.

The input apparatus 45 includes an input device. The input device is, for example, a mouse, a keyboard, a touch panel, and/or other device capable of receiving user operations. The input apparatus 45 further includes an information acquisition device such as a camera or a scanner.

The storage device 47 includes a storage medium such as a hard disk or a flash memory, for example. The storage device 47 stores applications installed on the client device 4 from the app provisioning server 5. In the present embodiment, the storage device 47 stores the wallet app 50.

<Use of Wallet App and Mini App>

In the data sharing system 1 having the configuration as described above, the wallet app 50 (the super app) installed on the client device 4 becomes available for use after having undergone registration of user information and the identity verification (KYC) of the user. Furthermore, in order to use the mini apps (the first app 51 through the fourth app 54) of the wallet app 50, the user is requested to provide the user information to an enterprise (e.g., the enterprise A in the case of the first app 51) providing the mini apps, and undergo the KYC by the enterprise. For example, to subscribe to the first app 51, the user is requested to provide the user information to the service server 3-1 (the enterprise A), while the user is not requested to do so to the service servers 3-2 through 3-4 (the enterprise 8, the enterprise C, the enterprise D). In general, in the distributed ledger technique such as blockchain, data is shared among all nodes joined in the network. Thus, the data sharing only among particular nodes is impossible. An approach is desired for allowing data to be shared only among particular nodes using the distributed ledger technique, while improving the tamper-resistant of the data. Moreover, it is cumbersome for enterprises and users to implement the KYC for each service server 3 (enterprise) providing mini apps, and a countermeasure to this is needed.

Thus, the data sharing system 1 according to the present embodiment stores into the main chain a result of the KYC performed by a management enterprise (the management server 2) providing the super app, and the KYC result is shared among those joined the network NW. When a respective enterprise, providing a mini app, receives an application for using the mini app, the enterprise can regard that the user's identity has been verified by checking the KYC result on the main chain and omit implementing the KYC by the enterprise itself.

An enterprise having received an application for using a mini app also needs to obtain the user information in order to provide services to the user. In the data sharing system 1 according to the present embodiment, after the implementation of the KYC service, the user information that is entered for registration with the wallet app 50 is stored into the distributed ledger 272 (the sub chain) of the management server 2. If the user of the client device 4 agrees to provide the user information to the mini app, the user information stored in the distributed ledger 272 is shared, through the sub chain, with the distributed ledger 372 of the service server 3 providing the mini app.

Figure 5:
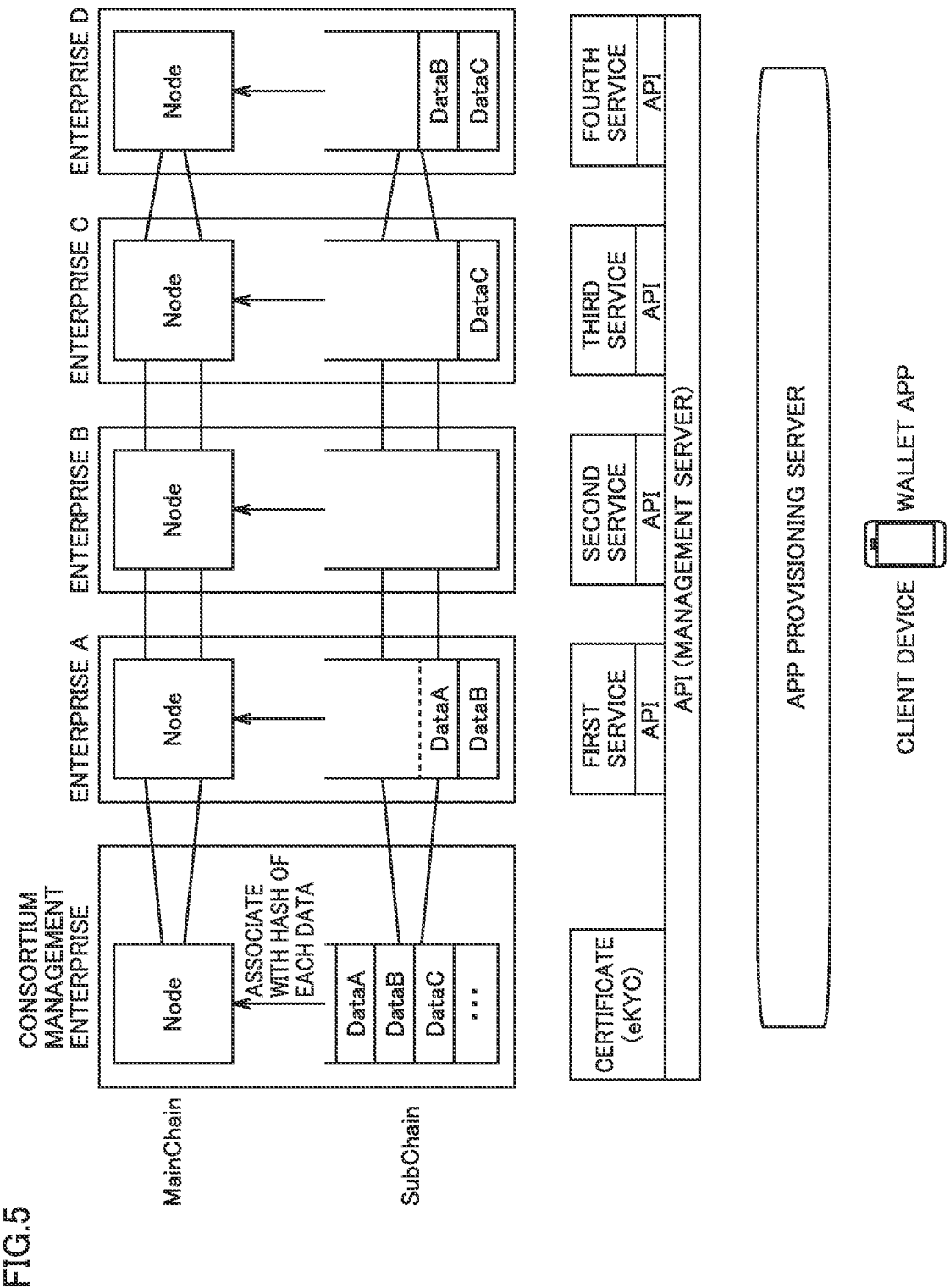
FIG. 5 is a diagram schematically showing a system configuration of the data sharing system.

FIG. 5 is a diagram schematically showing a system configuration of the data sharing system 1. Referring to FIG. 5 and FIGS. 6 through 8 described below, a series of process steps will be described from subscribing to the wallet app and the mini app to cancelling the subscription thereto.

<<Installation of Wallet App: KYC>>

Figure 6:
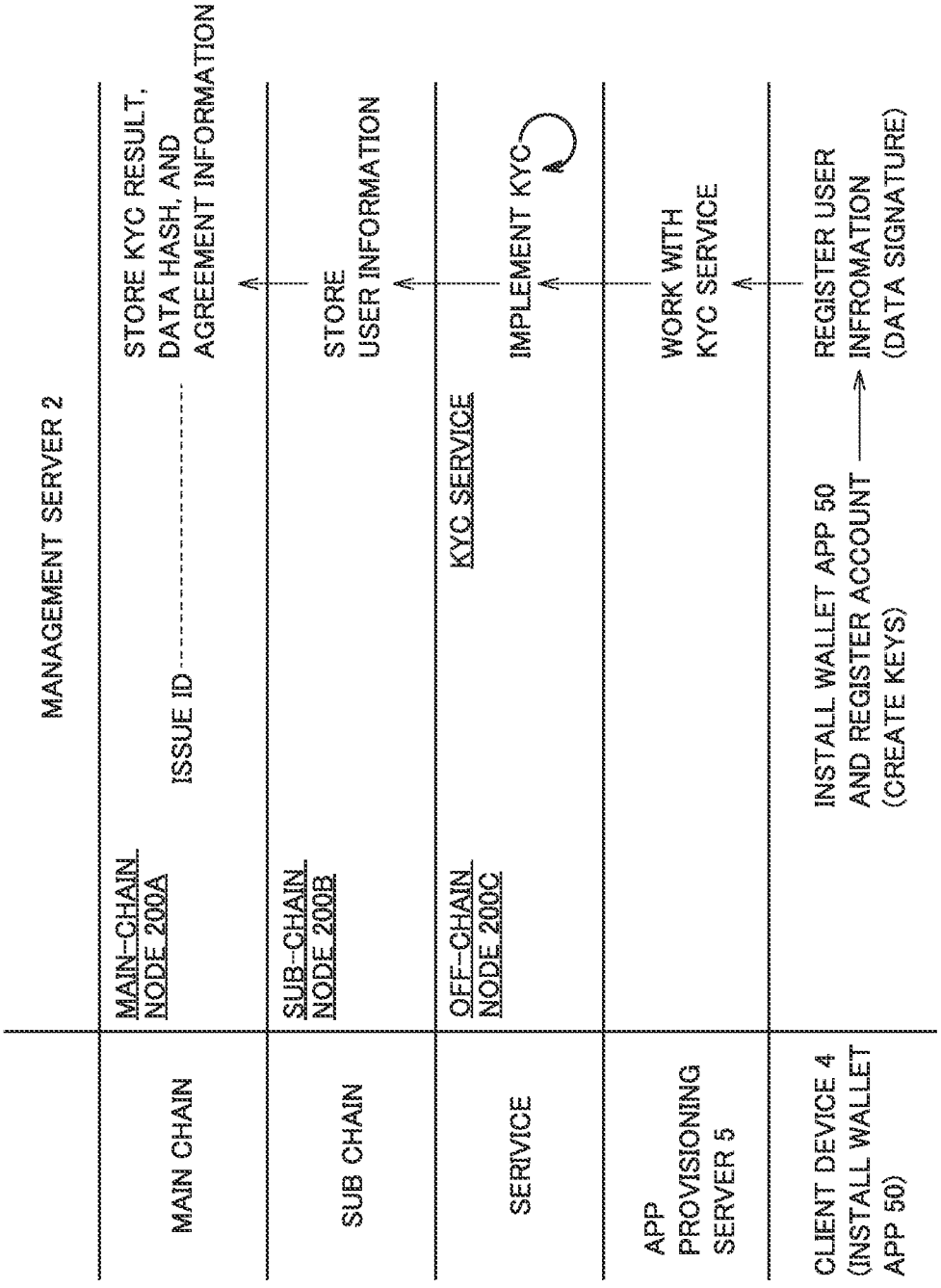
FIG. 6 is a diagram schematically showing a flow of information during a process that is performed to install a wallet app on the client device.

FIG. 6 is a diagram schematically showing a flow of information during a process that is performed to install the wallet app 50 on the client device 4. Referring to FIGS. 5 and 6, as the wallet app 50 is installed on the client device 4, the wallet app 50 (the app provisioning server 5) requests the client device 4 to register an account. In response to the request for the account registration, the control device 41 of the client device 4 generates a private key and a public key. The control device 41 may transmit the public key to the certificate authority (not shown) to have the public key certified. The control device 41 stores a private key corresponding to the certified public key into the storage device 47. As described below, the certified public key is also used as an ID for the client device 4 (the user) in the main chain.

Next, the wallet app 50 requests the client device 4 to register the user information. The control device 41 of the client device 4 shows input fields for user information on the display screen of the display device 46, for example. For example, the user information includes information such as name, date of birth, address, age, etc. The user enters the information such as the name, the date of birth, the address, the age, etc. via the input apparatus 45. Furthermore, the user information further includes information for identity verification. The information for identity verification may be, for example, driver's license, my number card, or health insurance card, etc. The user, for example, captures an image of the driver's license with a camera included in the input apparatus 45 or the like, and registers that information as the user information.

The registered user information is sent to the app provisioning server 5 via the communication device 44 of the client device 4. The app provisioning server 5 accesses the API 210 of the management server 2 implementing the KYC service, and transmits the user information and a request for implementing the KYC to the management server 2. The public key information of the client device 4 is also sent from the client device 4 to the management server 2 via the app provisioning server 5. Note that the app provisioning server 5 may check whether the user information is incomplete, and/or the volume of the image data captured of the driver's license or the like falls within a defined reference range for implementing the KYC service.

Upon receiving the request for implementing the KYC, the management server 2 implements the KYC service. The management server 2 then stores the user information having undergone the KYC process into the distributed ledger 272, thereby updating the sub chain, issues an ID for the user of the client device 4 (hereinafter, also referred to as a "user ID") to the main chain, and stores, into the distributed ledger 271, the KYC result associated with the user ID, thereby updating the main chain.

Specifically, upon receiving the request for implementing the KYC, the off-chain node 200C of the control device 21 functions. The off-chain node 200C implements the KYC, using the obtained user information. The implementation of the KYC may involve intervention of the administrator of the management server 2 or an employee of the enterprise operating the management server 2 for example. If determined that the identity verification has no issues as a result of the implementation of the KYC, the off-chain node 200C outputs information indicating the completion of the KYC to the sub-chain node 200B.

Upon obtaining the information indicating the completion of the KYC, the sub-chain node 2003 of the control device 21 functions. The sub-chain node 200B generates transaction data for updating the sub chain. At this time, the user of the client device 4 agrees to provide the user information to the wallet app 50, and does not agree to provide the user information to the mini app in the wallet app 50. Therefore, the user information is stored only into the distributed ledger 272 of the management server 2 at this time, and not in the distributed ledgers 372-1 through 372-4 of the service servers 3-1 through 3-4. Thus, the transaction data contains the user information, and the management server 2 itself is designated as the destination of the transaction data. Furthermore, the transaction data also contains a hash value of the user information (hereinafter, also referred to as a "data hash"). The sub-chain node 200E processes the transaction data, and stores the user information and the data hash into the distributed ledger 272. The data hash is stored in the distributed ledger 272 in order to reduce the labor cost for generating the hash value of the user information each time the agreement information (authorization information) described below is checked for updates. In FIG. 5, the user information and the data hash are denoted as "DataA." As described above, DataA is, at this time, stored only in the distributed ledger 272 of the management server 2.

As the sub chain is updated, the main-chain node 200A of the control device 21 functions. The main-chain node 200A generates transaction data for updating the main chain. Specifically, the main-chain node 200A generates transaction data which contains the data hash, the agreement information, and the information indicating the KYC verification result. All the nodes (the main-chain node 200A and the main-chain nodes 300A-1 through 300A-4) forming the main chain are designated as the destinations of the transaction data. The information indicating the owner of the transaction data contains the hash value of the public key of the client device 4. The transaction data is broadcasted to the network NW, processed by the main-chain node 200A of the management server 2 and the main-chain node 300A of the service server 3, and the hash value of the public key of the client device 4 is thereby issued to the main chain as an ID of the client device 4 (hereinafter, also referred to as a "user ID"). Then, the data hash, the agreement information, and the information indicating the KYC verification result are stored, associated with the user ID, into the main chain (the distributed ledger 271 and the distributed ledger 371).

The agreement information (the authorization information) defines an extent to which the user information is shared, and contains information indicating "who (From)" "agrees about what data (Hash)" "with who (To)." Specifically, the agreement information contains the information indicating the origin of agreement (From), the information indicating the destination of agreement (To), and the information indicating target data (Hash). In the above-described example, the information indicating the origin of agreement is, for example, the user ID (the hash value of the public key of the client device 4). The information indicating the destination of agreement is, for example, the ID of the management server 2 (e.g. the hash value or address of the public key of the management server 2), which ID is information identifying the management server 2. The information indicating the target data is, for example, the hash value (the data hash) of the user information.

The information regarding the KYC verification result indicates a result of implementation of the KYC, and contains the information indicating "who (From)" "has confirmed what data (Hash)" of "who (To)." Specifically, the information regarding the KYC verification result contains the information (From) indicating who has implemented the KYC, the information (To) indicating who is a target of the KYC, and the information (Hash) indicating the KYC's target data. In the above-described example, the information indicating who has implemented the KYC is, for example, the ID of the management server 2 (e.g., the hash value or address of the public key of the management server 2), which ID is the information identifying the management server 2. The information indicating who is a target of KYC is, for example, the user ID (the hash value of the public key of the client device 4). The information indicating the KYC's target data is, for example, the hash value (the data hash) of the user information.

As described above, the installation of the wallet app 50 on the client device 4 involves the implementation of the KYC on the user by the management server 2 (a management enterprise) providing the wallet app 50. Then, the user information is stored into the distributed ledger 272 of the management server 2. Furthermore, the user ID is issued to the main chain, and the KYC result, the hash value (the data hash) of the user information, and the agreement information are stored, associated with the user ID, into the main chain (the distributed ledger 271 and the distributed ledgers 371-1 through 371-4).

<<Subscription of Mini App: Omission of KYC>>

Figure 7:
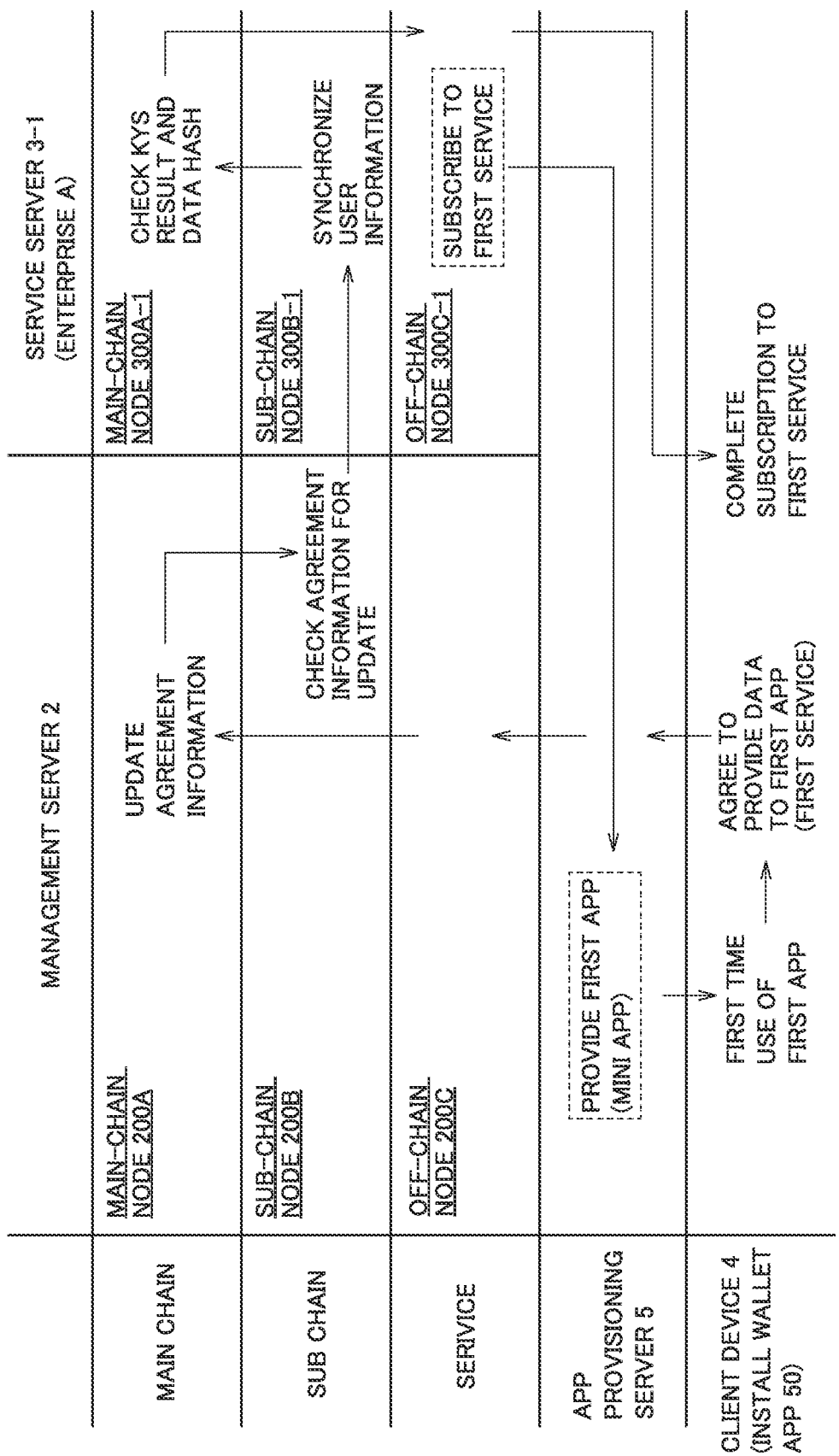
FIG. 7 is a diagram schematically showing a flow of information during a process that is performed to subscribe to a first app in the wallet app.

FIG. 7 is a diagram schematically showing a flow of information during a process that is performed to subscribe to the first app 51 in the wallet app 50 (first time use). FIG. 7 will be described with reference to the first app 51 as a mini app. Referring to FIGS. 5 and 7, assume that the enterprise A providing the first service has determined to provide (distribute) the first app 51 as a mini app of the wallet app 50. Accordingly, the first app 51 is provided as a mini app of the wallet app 50.

For example, the user of the client device 4 launches the wallet app 50, and selects the first app 51 displayed on the display screen of the display device 46. When the first app 51 is used for the first time (launched), the wallet app 50 (the app provisioning server 5) requests the user of the client device 4 to subscribe to the first app 51. Specifically, the wallet app 50 requests the user of the client device 4 to provide user information to the first app 51 (the service server 3-1 providing the first service). In response to the request, the control device 41 of the client device 4 shows an agreement screen on the display device 46 for requesting the user to provide the user information to the first app 51 (the service server 3-1 providing the first service). The user of the client device 4 operates the input apparatus 45 and agrees to provide the user information to the first app 51.

The control device 41 of the client device 4 transmits the information indicating that the user has agreed to provide the user information (the information indicating the agreement) to the app provisioning server 5 via the communication device 44. The app provisioning server 5 transmits the information indicating the agreement to the management server 2.

Upon receiving the information indicating the agreement, the management server 2 updates the agreement information on the main chain. Based on the updated agreement information, the management server 2 then transmits the user information to the service server 3-1 on the sub chain.

Specifically, upon receiving the information indicating the agreement, the off-chain node 200C of the control device 21 functions and notifies the main-chain node 200A that the off-chain node 200C has received the information indicating the agreement.

Upon receiving the notification, the main-chain node 200A updates the agreement information. Specifically, the main-chain node 200A generates transaction data which contains agreement information in which the ID of the service server 3-1 (e.g., the hash value or address of the public key of the service server 3-1) is added to the information indicating the destination of agreement. In other words, the information indicating the destination of agreement, contained in the agreement information, includes the ID of the management server 2 and the ID of the service server 3-1. The main-chain node 200A broadcasts the transaction data to the network NW. As the transaction data is processed by the main-chain nodes 200A and 300A, the distributed ledgers 271 and 371 are updated. This updates the agreement information stored on the main chain.

As the agreement information in the distributed ledger 271 (the main chain) is updated, the sub-chain node 200B views the content of the updated agreement information. The sub-chain node 200B, by viewing, recognizes that the service server 3-1 is now authorized to obtain the user information. As described above, the information (Hash) indicating the target data of the agreement information stores the hash value. In the present embodiment, since the distributed ledger 272 stores the data hash, in addition to the user information, when the sub-chain node 200I views the content of the updated agreement information, the sub-chain node 200B can identify the user information to be shared with the sub-chain node 300B of the service server 3-1, without hashing again the user information.

The sub-chain node 200B generates transaction data storing the user information and the data hash. The sub-chain node 300B-1 of the service server 3-1 is designated as the destination of the transaction data.

Note that upon generating the transaction data for transmission to the sub-chain node 300B-1 of the service server 3-1, the sub-chain node 200B sends to the notary node 65 data that includes the hash value of the transaction data and the index of an output of the transaction data. This gives finality to the transaction data.

The sub-chain node 300B-1 of the service server 3-1 processes the transaction data received from the sub-chain node 200B of the management server 2, and stores the user information into the distributed ledger 372-1. This allows the user information to be synchronized (shared) with the distributed ledger 372-1, updating the sub chain. Not that the transaction data, at this time, is not transmitted to the sub-chain nodes 300B-2 through 300B-4 of the service servers 3-2 through 3-4. As shown in FIG. 5, the DataA is also stored into the distributed ledger 372-1 of the service server 3-1, and the DataA is now held at the distributed ledger 272 of the management server 2 and the distributed ledger 372-1 of the service server 3-1.

As the user information is synchronized with the distributed ledger 372-1, the main-chain node 300A-1 of the service server 3-1 refers to the main chain (the distributed ledger 371-1) and checks the hash value (the data hash) and the KYC result in the synchronized user information. Specifically, the main-chain node 300A-1 compares the hash value of the synchronized user information with the distributed ledger 371-1. The hash value of the user information may be generated by the main-chain node 300A-1, or the data hash stored in the distributed ledger 372-1 may be used. By the comparison, the main-chain node 300A-1 identifies the user ID that is associated with the data hash. The main-chain node 300A-1 then refers to the agreement information associated with the identified user ID, thereby confirming that the user information synchronized with the distributed ledger 372-1 is permitted to be provided to the management server 2 and the service server 3-1. This allows the main-chain node 300A-1 to recognize that it is appropriate that the main-chain node 300A-1 has been provided with the user information. The main-chain node 300A-1 also refers to the KYC result associated with the identified user ID, thereby confirming that the management server 2 (a management enterprise) has already implemented the KYC process on the user having the user ID.

When the main-chain node 300A-1 confirms that the KYC process has been implemented, the off-chain node 300C-1 completes the subscription to the first service. This allows the user of the client device 4 to use the first service, using the first app 51.

While the above has been described with reference to the subscription to the first app 51, it should be noted that the same stands true for subscriptions to the second app 52 through the fourth app 54.

<<Cancellation of Subscription to Mini App>>

Figure 8:
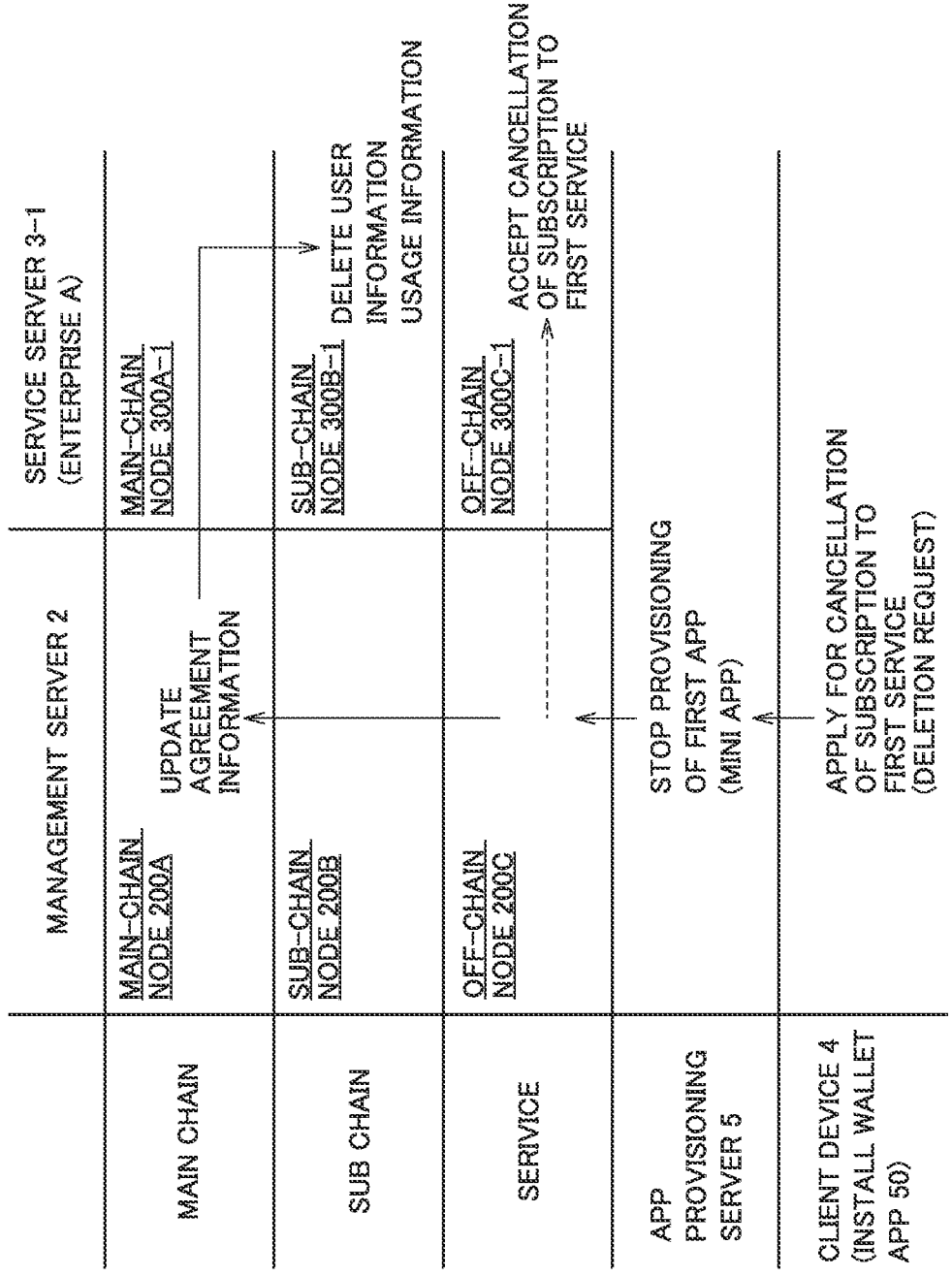
FIG. 8 is a diagram schematically showing a flow of information during a process that is performed to cancel the subscription to the first app.

FIG. 8 is a diagram schematically showing a flow of information during a process that is performed to cancel the subscription to the first app 51.

Referring to FIGS. 5 and 8, the user of the client device 4 makes an application for cancelling the subscription to the first app (the first service) through the wallet app 50. The application for cancelling the subscription includes requesting (a deletion request) to delete the user information from the first app 51 (the service server 3-1). The user of the client device 4 can make the application for cancelling the subscription by depressing a cancel button, which is shown on the display device 46 when using the first app 51, for example. The application for cancelling the subscription is transmitted to the app provisioning server 5 via the communication device 44 of the client device 4.

The app provisioning server 5 determines to stop provisioning of the first app 51 to the client device 4. The app provisioning server 5 then transmits a notification that the provisioning is stopped to the management server 2.

Upon receiving the notification that the provisioning is stopped, the management server 2 updates the agreement information on the main chain (the distributed ledger 271). Specifically, upon receiving the notification that the provisioning is stopped from the app provisioning server 5, the off-chain node 200C outputs that notification to the main-chain node 200A. The main-chain node 200A deletes the ID of the service server 3-1 from the information (To) indicating the destination of agreement, included in the agreement information, and generates transaction data which contains the agreement information. In other words, the information indicating the destination of agreement in the updated agreement information includes only the ID of the management server 2. The main-chain node 200A broadcasts the transaction data to the network NW. The main-chain node 200A and the main-chain node 300A process the transaction data, the agreement information on the main chain (the distributed ledgers 271 and 371) is thereby updated.

As the sub-chain node 300B-1 of the service server 3-1 recognizes that the agreement information has been updated and the sub-chain node 300B-1 has lost its authorization to hold its user information, the sub-chain node 300B-1 deletes the user information (DataA) from the distributed ledger 372-1. Moreover, if usage information associated with the use of the first service by the user is stored in the distributed ledger 372-1, the sub-chain node 300B-1 also deletes the usage information.

Note that, upon receiving the notification that the provisioning is stopped from the app provisioning server 5, the off-chain node 200C may notify the service server 3-1 of this via the communication device 24. As a result of this, the service server 3-1 may accept the cancellation of the subscription.

<Flowchart>

Figure 9:
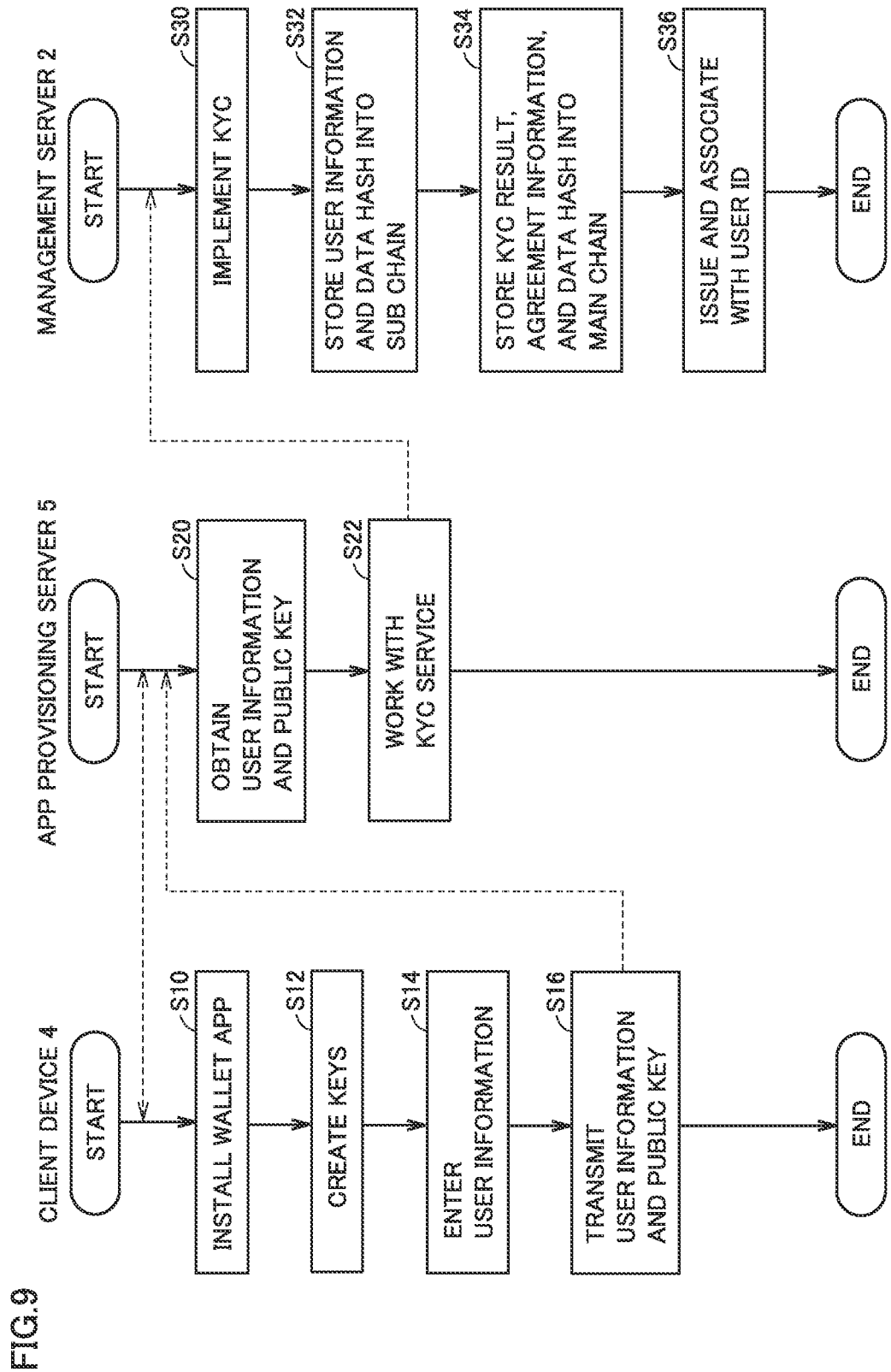
FIG. 9 is a flowchart illustrating a procedure for a process which is performed to install a wallet app on the client device.

FIG. 9 is a flowchart illustrating a procedure for a process which is performed to install the wallet app 50 on the client device 4. The process of the flowchart shown in FIG. 9 starts with the client device 4 accessing the app provisioning server 5. Note that the steps (hereinafter, a step will be abbreviated as "S") of the flowchart shown in FIG. 9 will be described as being implemented by software processing by the control device 41 of the client device 4, the app provisioning server 5, and the control device 21 of the management server 2, but some or all of which may be implemented by hardware (electric circuits) fabricated within the control device 41, the app provisioning server 5, and the control device 21.

In S10, a user operation of installing the wallet app 50 is performed on the client device 4. In response to the user operation, the control device 41 of the client device 4 installs the wallet app 50 on the app provisioning server 5.

In S12, the control device 41 of the client device 4 is requested by the wallet app 50 (the app provisioning server 5) to register an account. In response to the request to register an account, the control device 41 of the client device 4 generates a private key and a public key. The control device 41 may transmit the public key to the certificate authority (not shown) to have the public key certified.

In S14, the control device 41 of the client device 4 is requested by the wallet app 50 to register user information. In response to the request to register user information, the control device 41 of the client device 4 shows input fields for the user information on the display screen of the display device 46. When the user has entered information in the input fields, the control device 41 of the client device 4 registers the entered information as the user information.

In S16, the control device 41 of the client device 4 transmits the user information and the public key information to the app provisioning server 5.

In S20, the app provisioning server 5 obtains the user information and the public key information from the client device 4.

In S22, in order to work with the KYC service, the app provisioning server 5 transmits the user information obtained in S20 and a request for implementing the KYC to the management server 2 implementing the KYC service. The app provisioning server 5 also transmits the public key information of the client device 4 to the management server 2.

In S30, in response to the request for implementing the KYC, the control device 21 of the management server 2 implements the KYC service. The implementation of the KYC may involve intervention of the administrator of the management server 2 or an employee of the enterprise operating the management server 2 for example. If determined that the identity verification has no issues as a result of the implementation of the KYC, the control device 21 of the management server 2 passes the process to S32.

In S32, the control device 21 of the management server 2 generates transaction data for updating the sub chain. The control device 21 of the management server 2 includes the user information and the data hash into the transaction data. The control device 21 of the management server 2 also designates the sub-chain node 200B itself as the destination of the transaction data. The control device 21 of the management server 2 processes the transaction data, stores the user information and the data hash into the distributed ledger 272, thereby updating the sub chain.

In S34 and S36, the control device 21 of the management server 2 generates transaction data for updating the main chain. The control device 21 of the management server 2 includes the data hash, the agreement information, and the information indicating the KYC verification result into the transaction data. The control device 21 of the management server 2 also designates all nodes (the main-chain node 200A and the main-chain nodes 300A-1 through 300A-4) forming the main chain, as the destinations of the transaction data. The control device 21 of the management server 2 also includes, into the transaction data: the hash value of the public key of the client device 4 as information indicating the owner of the transaction data. The transaction data is broadcasted to the network NW, and processed by the main-chain node 200A of the management server 2 and the main-chain node 300A of the service server 3, and thereby the user ID is issued on the main chain and the data hash, the agreement information, and the information indicating the KYC verification result are stored, associated with the user ID, into the main chain (the distributed ledger 271 and the distributed ledger 371).

Figure 10:
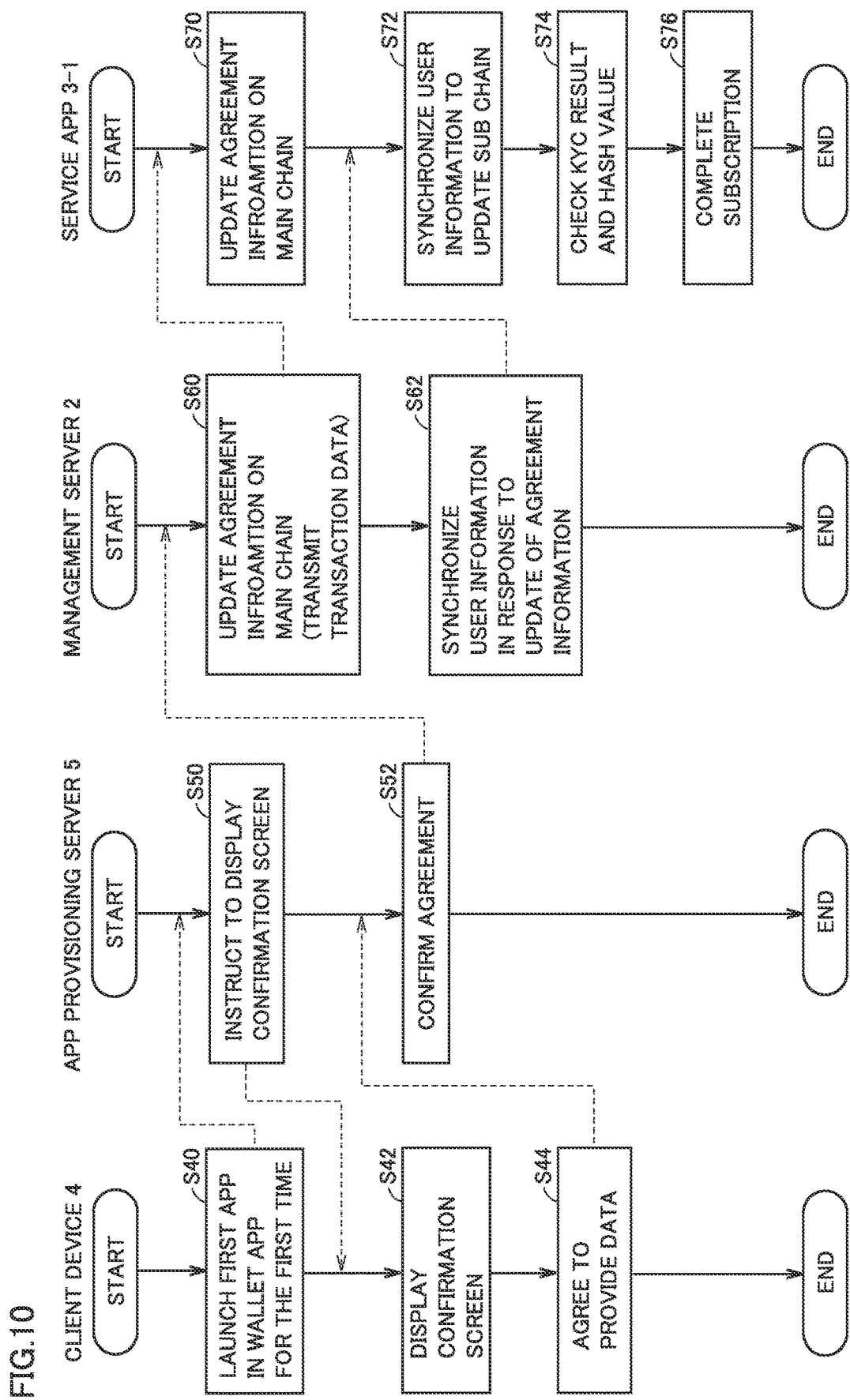
FIG. 10 is a flowchart illustrating a procedure for a process which is performed to subscribe to the first app.

FIG. 10 is a flowchart illustrating a procedure for a process which is performed to subscribe to the first app 51. The process of the flowchart shown in FIG. 10 starts with a user operation of launching the first app 51 in the wallet app 50 for the first time. Note that the steps of the flowcharts shown in FIG. 10 and FIG. 11 described below will be described as being implemented by software processing by the control device 41 of the client device 4, the app provisioning server 5, the control device 21 of the management server 2, and the control device 31-1 of the service server 3-1, but some or all of which may be implemented by hardware (electric circuits) fabricated within the control device 41, the app provisioning server 5, the control device 21, and the control device 31-1.

In S40, in response to the user operation, the control device 41 of the client device 4 launches the first app 51 in the wallet app 50 for the first time.

In S50, the app provisioning server 5 (the wallet app 50) returns an instruction to the client device 4, instructing the client device 4 to display a confirmation screen requesting the user of the client device 4 to agree to provide the user information to the service server 3-1 providing the first app 51 (the first service). The user information, as used herein, is the user information (e.g., DataA in the example of FIG. 5) that is provided to the management server 2 at the installation of the wallet app 50.

In S42, the control device 41 of the client device 4 displays the confirmation screen, in accordance with the instruction from the app provisioning server 5 (the wallet app 50).

In S44, the user of the client device 4 performs an agreement operation on the confirmation screen, indicating the agreement. The control device 41 of the client device 4 transmits the information indicating the agreement to the app provisioning server 5.

In S52, upon confirming as having obtained the information indicating the agreement, the app provisioning server 5 transmits the information indicating the agreement to the management server 2.

Upon receiving the information indicating the agreement, the control device 21 of the management server 2, in S60, updates the agreement information on the main chain. Specifically, the control device 21 (the main-chain node 200A) of the management server 2 generates transaction data which contains the agreement information in which the ID of the service server 3-1 is added to the information indicating the destination of agreement. The control device 21 of the management server 2 broadcasts the transaction data to the network NW.

In S70, the control device 31-1 (the main-chain node 300A-1) of the service server 3-1 processes the transaction data obtained from the management server 2. This updates the distributed ledger 371-1. Similarly, the transaction data transmitted in S60 is processed by the service servers 3-2 through 3-4 (the main-chain nodes 300A-2 through 300A-4), thereby updating the distributed ledgers 371-2 through 371-4. This updates the agreement information stored on the main chain. The updated agreement information indicates that the user of the client device 4 agrees to provide the user information to the management server 2 (a management enterprise) and the service server 3-1 (the enterprise A).

In S62, because of the agreement information being updated, the control device 21 of the management server 2 recognizes that the service server 3-1 of the main chain (the distributed ledger 271) is now authorized to obtain the user information. The control device 21 (the sub-chain node 200B) of the management server 2 generates transaction data storing the user information and the data hash. The control device 21 (the sub-chain node 200B) of the management server 2 designates the sub-chain node 300B-1 of the service server 3-1 as the destination of the transaction data. Note that the control device 21 (the sub-chain node 200B) of the management server 2 also transmits to the notary node 65 data that includes a hash value of the transaction data and the index of an output of the transaction data.

In S72, the control device 31-1 (the sub-chain node 300B-1) of the service server 3-4 processes the transaction data received from the management server 2, and stores the user information into the distributed ledger 372-1. This synchronizes the user information with the distributed ledger 372-1, which updates the sub chain.

Upon the user information being synchronized with the distributed ledger 372-1, the control device 31-1 (the main-chain node 300A-1) of the service server 3-1L in S74, refers to the main chain (the distributed ledger 371-1) and checks the hash value (the data hash) of the synchronized user information and the KYC result. Specifically, the control device 31-1 of the service server 3-1 compares the hash value of the synchronized user information with the distributed ledger 371-1. By the comparison, the control device 31-1 of the service server 3-1 identifies the user ID that is associated with the data hash. The control device 31-1 of the service server 3-1 then refers to the agreement information associated with the identified user ID, and thereby confirms that the user information synchronized with the distributed ledger 372-1 is permitted to be provided to the management server 2 and the service server 3-1. This allows the control device 31-1 of the service server 3-1 to recognize that it is appropriate that the service server 3-1 itself has been provided with the user information. The control device 31-1 of the service server 3-1 also refers to the KYC result associated with the identified user ID, thereby confirming that the management server 2 (a management enterprise) has implemented the KYC process on the user having the user ID.

Upon confirming that the KYC process has been implemented, the control device 31-1 of the service server 3-1 completes the subscription to the first service.

Figure 11:
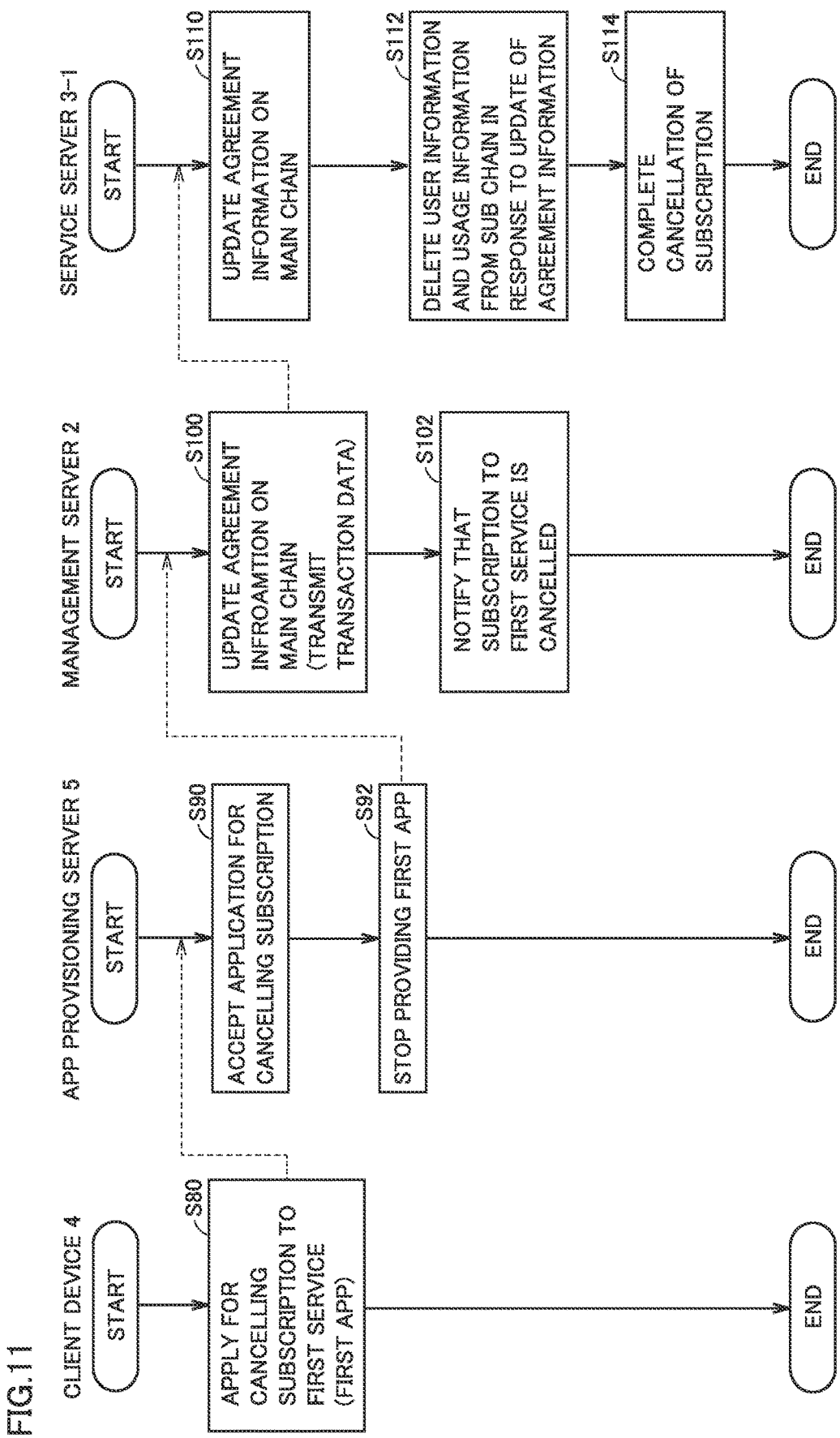
FIG. 11 is a flowchart illustrating a procedure for a process which is performed to cancel the subscription to the first app (a first service).

FIG. 11 is a flowchart illustrating a procedure for a process which is performed to cancel the subscription to the first app S1 (the first service). The process of the flowchart shown in FIG. 11 start with a user operation of making an application for cancelling the subscription to the first app 51.

In S80, in response to the user operation, the control device 41 of the client device 4 transmits the application for cancelling the subscription to the first app 51 (the first service) to the app provisioning server 5.

Upon receiving the application for cancelling the subscription from the client device 4, the app provisioning server 5, in S90, accepts the application for cancelling the subscription.

In S92, the app provisioning server 5 determines to stop providing the first app 51 to the client device 4. The app provisioning server 5 then transmits a notification that the provisioning is stopped to the management server 2.

Upon receiving the notification that the provisioning is stopped, the control device 21 (the main-chain node 200A) of the management server 2, in S100, updates the agreement information on the main chain (the distributed ledger 271). Specifically, the control device 21 of the management server 2 deletes the ID of the service server 3-1 from the information (To) indicating the destination of agreement included in the agreement information, and generates transaction data which include the agreement information and broadcasts the transaction data to the network NW.

In S110, the control device 31-1 (the main-chain node 300A-1) of the service server 3-1 processes the transaction data obtained from the management server 2. This updates the distributed ledger 371-1. Similarly, the transaction data transmitted in S110 is processed by the service servers 3-2 through 3-4 (the main-chain nodes 300A-2 through 300A-4), thereby updating the distributed ledgers 371-2 through 371-4. This updates the agreement information stored on the main chain. The updated agreement information indicates that the user of the client device 4 permits the user information to be provided only to the management server 2 (a management enterprise).

If the control device 31-1 (the sub-chain node 300B-1) of the service server 3-1 recognizes that the agreement information has been updated and the service server 3-1 itself has lost its authorization to hold its user information, the control device 31-1, in S112, deletes the user information from the distributed ledger 372-1. Moreover, if usage information associated with the use of the first service by the user is stored in the distributed ledger 372-1, the control device 31-1 of the service server 3-1 also deletes that usage information.

In S114, the control device 31-1 of the service server 3-1 completes the cancellation of the users subscription.

Note that, in S102, the control device 21 of the management server 2 may notify the service server 3-1 that the control device 21 has received a notification that the provisioning is stopped from the app provisioning server 5. In response to this, the control device 31-1 of the service server 3-1 may accept the cancellation of the subscription.

As described above, in the data sharing system 1 according to the present embodiment, the KYC service is implemented by the management server 2 (a management enterprise) when the wallet app 50 is installed on the client device 4. The information indicating the KYC result is stored into the main chain in which data are shared among all main-chain nodes joined the network NW. This allows the information indicating the KYC result to be monitored by all the main-chain nodes joined the network NW, thereby enhancing the tamper-resistant of the information.

When the user subscribes to a mini app (e.g., the first app 51) of the wallet app 50, the service server 3 (an enterprise) providing the mini app refers to the main chain and checks the KYC result implemented by the management server 2, without implementing the KYC on the user. The service server 3 (an enterprise) ends the KYC with this confirmation process. In this manner, the implementation of KYC can be omitted by the service server 3 referring to the KYC result implemented by the management server 2.

The service server 3 (an enterprise), having received an application for use of the mini app, needs to obtain the user information in order to provide the service to the user in the data sharing system 1 according to the present embodiment, based on the user agreement, the user information is synchronized, using a P2P sub chain, with the service server 3 that is authorized to obtain the user information from the management server 2. The agreement information is monitored by all the main chains by managing the agreement information on a broadcast-type main chain, thereby enhancing the tamper-resistant of the agreement information. Then, based on the agreement information shared on the main chain, the data can be synchronized only among particular sub-chain nodes on a P2P sub chain. Thus, a combination of the broadcast-type main chain and the P2P sub chain enhances the tamper-resistant of the agreement information, allowing the data to be synchronized only among particular sub-chain nodes based on the agreement information.

Furthermore, a combination of the broadcast-type main chain with the P2P sub chain enhances the tamper-resistant of the agreement information, allowing only data that are synchronized among particular sub-chain nodes to be deleted based on the agreement information shared on the main chain.

[Variation 1]

In the embodiment, the user ID is issued to an inner chain when the KYC result, etc. are stored into the main chain, as shown in FIG. 6, for example. However, the timing at which the user ID is issued to the main chain may differ.

Figure 12:
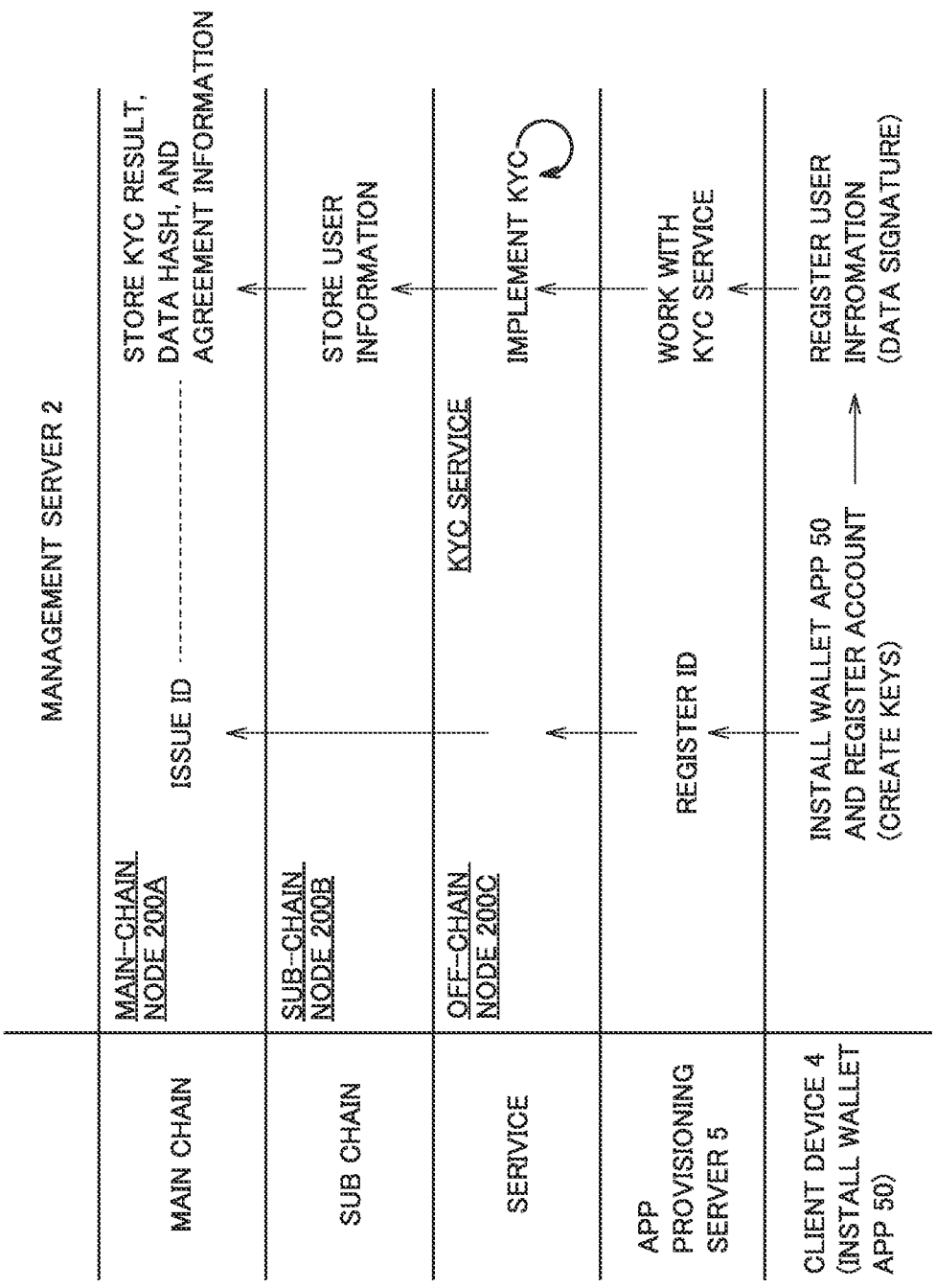
FIG. 12 is a diagram schematically showing a flow of information during a process that is performed to install a wallet app on the client device, according to a variation of the embodiment.

FIG. 12 is a diagram schematically showing a flow of information during a process that is performed to install the wallet app 50 on the client device 4, according to a variation of the embodiment.

Referring to FIG. 12, when the wallet app 50 is installed on the client device 4, the wallet app 50 (the app provisioning server 5) requests the client device 4 to register an account, as with the embodiment. In response to the request to register an account, the control device 41 of the client device 4 generates a private key and a public key. The control device 21 may transmit the public key to the certificate authority (not shown) to have the public key certified. The control device 41 stores a private key corresponding to the certified public key into the storage device 47.

The control device 41 of the client device 4 transmits the certified public key and the hash value of the public key to the app provisioning server 5.

The app provisioning server 5 registers an ID of the user, using the public key and the hash value of the public key as the ID.

When the registration of the user's ID is completed, the app provisioning server 5 transmits to the management server 2 the hash value of the public key and a request for issuing an ID.

Upon receiving the hash value of the public key and the request for issuing an ID, the management server 2 issues a user ID to the main chain, using the hash value as the ID. Specifically, upon receiving the hash value of the public key and the request for issuing an ID from the app provisioning server 5, the off-chain node 200C functions, and outputs the hash value of the public key to the main-chain node 200A.

The main-chain node 200A generates transaction data for issuing a user ID, and broadcasts the transaction data to the network NW. The transaction data is processed, and the user ID is thereby issued to the main chain.

The process steps subsequent to the registration of user information are the same as those according to the embodiment. After the KYC service is implemented and the user information is stored into the sub chain (the distributed ledger 272), the main-chain node 200A generates transaction data that includes the data hash, the agreement information, and the information indicating a KYC verification result. The user ID is designated as the information indicating the owner of the transaction data. The transaction data is processed, thereby storing the data hash, the agreement information, and the information indicating the KYC verification result, associated with the user ID, into the main chain (the distributed ledger 271 and the distributed ledger 371).

Variation 1, in which the user ID is issued to the main chain at the timing as described above, yields advantageous effects similar to those of the embodiment.

[Variation 2]

Embodiment and Variation 1 have been described with reference to providing the first app 51 through the fourth app 54 as mini apps of the wallet app 50. However, the first app 51 through the fourth app 54 each may be provided to the app provisioning server 5 as a single application, rather than as a mini app. Furthermore, in this case, the enterprises A through D (the service servers 3-1 through 3-4) may include a server, corresponding to the app provisioning server 5, for providing the first app 51 through the fourth app 54.

Even with such a configuration described above, when a respective application (the first app 51 through the fourth app 54) is installed on the client device 4, each service server 3 (the service servers 3-1 through 3-4) can omit the implementation of the KYC by referring, based on the user ID, to a result of the KYC which is implemented by the management server 2 and stored on the main chain. Since the client device 4 uses a common public key to register accounts for the wallet app 50 and the first app 51 through the fourth app 54, a common user ID (the hash value of the public key) is issued to the main chain, thereby allowing the service server 3 to refer to the KYC result based on the user ID. Accordingly, even with such a configuration described above, Variation 2 yields advantageous effects similar to those of the embodiment.

[Variation 3]

According to the embodiment and Variations 1 and 2 thereof, the management server 2 includes the function of managing the network NW and the function of implementing the KYC service. However, the function of managing the network NW and the function of implementing the KYC service may be included in different servers. In this case, the wallet app 50 is provided to the user by a service server providing the KYC service.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A data sharing system using a distributed ledger technique, in which a consortium network is formed,
   the data sharing system comprising
   a management server apparatus that manages the consortium network comprising memory storing instructions and a processor, and
   a plurality of service server apparatuses that each communicate with the management server apparatus, wherein
   each of the management server apparatus and the plurality of service server apparatuses comprise:
   a storage in which a first distributed ledger and a second distributed ledger are stored, the first distributed ledger being configured to facilitate the transmission of authorization information related to sharing of data amongst the plurality of service server apparatuses:
   memory storing instructions; and
   a control device comprising a processor, wherein the control device is configured to read the instructions to update the first distributed ledger and the second distributed ledger, and wherein
   the authorization information includes information for limiting the sharing of the data amongst the plurality of service server apparatuses,
   the second distributed ledger is configured for sharing the data amongst the plurality of server apparatuses based on the authorization information,
   based on the authorization, the control device of the management server apparatus is configured to execute the instructions to cause the management server apparatus to:
   transmit the data stored in the second distributed ledger of the management server apparatus to one or more of the plurality of service server apparatuses; and
   when the authorization information is updated, store the updated authorization information in the first distributed ledger of the management server apparatus,
   the management server apparatus is configured to transmit information to a terminal device of A user to install on the terminal device a wallet application that is a super application for providing a predetermined service, the predetermined service including an identity verification service, the super application being configured to provide access to a plurality of mini applications to which the user may subscribe via the wallet application, and the plurality of mini applications being hosted by the plurality of service server apparatuses,
   the terminal device is configured to transmit to the management server apparatus, via the wallet application, user information related to the user, the user information including personal information of the user, the control device of the management server apparatus is configured to execute the instructions to cause the management server apparatus to, upon receiving the user information:
store the authorization information corresponding to the user information in the first distributed ledger,
perform the identity verification service using the user information;
transmit, to the plurality of service server apparatuses, first transaction data including hash data corresponding to the user information having undergone identity verification and identity verification information indicating a result of the identity verification service, the identity verification information being associated with the hash data; and
store second transaction data including the hash data and the user information having undergone the identity verification in the second distributed ledger of the management server apparatus, the control device of the management server apparatus is further configured to execute the instructions to cause the management server apparatus to:
receive subscription information transmitted from the user terminal indicating the user has agreed to share user information with a mini application;
add to the authorization information of the first distributed ledger identifying information of a first service server apparatus corresponding to the mini application, and
transmit, to the plurality of service server apparatuses, third transaction data including the authorization information to which the identifying informaation of the second service server apparatus has been added, each of the plurality of service server apparatuses are configured to execute the instructions to cause each of the plurality of service server apparatuses to update, in accordance with the third transaction data, corresponding authorization information of a corresponding first distributed ledger of a corresponding services server apparatus in association with the hash data, and the control device of the management server apparatus is further configured to execute the instructions to cause the management server apparatus to:
transmit the second transaction data to the first service apparatus, based on the authorization information to which the identifying information of the first service server apparatus has been added;
compare the hash data of the second transaction data from the management server apparatus with the hash data of the first transaction data of the first distributed ledger of the first service server apparatus; and
complet a subscription corresponding to the mini application in accordance with:
a result of comparison between the harsh data, the updated authorization information of the first distributed ledger of the first service server apparatus, and
the identity verification information of the first distributed ledger of the first service server apparatus.

2. The data sharing system according to claim 1, wherein the control device of the management server apparatus is configured to execute the instructions to cause the management server apparatus to, when the terminal device makes a request for cancelling a subscription to the mini application;
delete the identifying information of the first service server apparatus from the authorization information.

3. The data sharing system according to claim 1, wherein each of the control devices of the plurality of service server apparatuses are configured to execute corresponding instructions of each of the corresponding service server apparatuses to cause each of the corresponding service server apparatuses to, when the identifying information of the first service server apparatus is added to the authorization information;
obtain the user information from the management server apparatus; and
store the user information into the second distributed ledger of the corresponding service server apparatus.

4. The data sharing system according to claim 3, wherein the first service server apparatus is configured to execute first instructions of the first service server apparatus to cause the first service server apparatuses to, when the identifying information of the first service server apparatus is deleted from the authorization information:
deletes the user information from the second distributed ledger of the first service server apparatus.

5. The data sharing system according to claim 3, wherein the mini application is an application that provides a car-rental service, a car-sharing service, an insurance service, a public service, a car-dealer service, or a maintenance service that can be settled with the wallet application.

6. The data sharing system according to claim 1, wherein a first distributed ledger of the first service server apparatus and a plurality of first distributed ledgers of the plurality of service server apparatuses comprise the same transaction data.

7. The data sharing system according to claim 1, wherein a second distributed ledger of the first service server apparatus and a second distributed ledger of a second service server apparatus comprise different transaction data.

8. The data sharing system according to claim 1, wherein the user information comprises information for identity verification, the information for identity verification comprising at least one of: driver's license information, health insurance card information, or a card number.

9. The data sharing system according to claim 8, wherein the user information further comprises information indicating a name, a date of birth, an address, or an age.

10. The data sharing system according to claim 1, wherein the subscription information comprises a certified public key and a hash value of the certified public key,
wherein the control device of the management server apparatus is configured to execute the instructions to cause the management server apparatus to:
receive a request for issuing a user ID; and
issue the user ID to the first distributed ledger, using the hash value of the certified public key as the user ID.

* * * * *